J. BRENZINGER.
CAN AND CAN COVER FEEDING DEVICE FOR CAN HEADING MACHINES.
APPLICATION FILED SEPT. 24, 1917.

1,367,455. Patented Feb. 1, 1921.
10 SHEETS—SHEET 4.

INVENTOR
Julius Brenzinger
BY
ATTORNEY

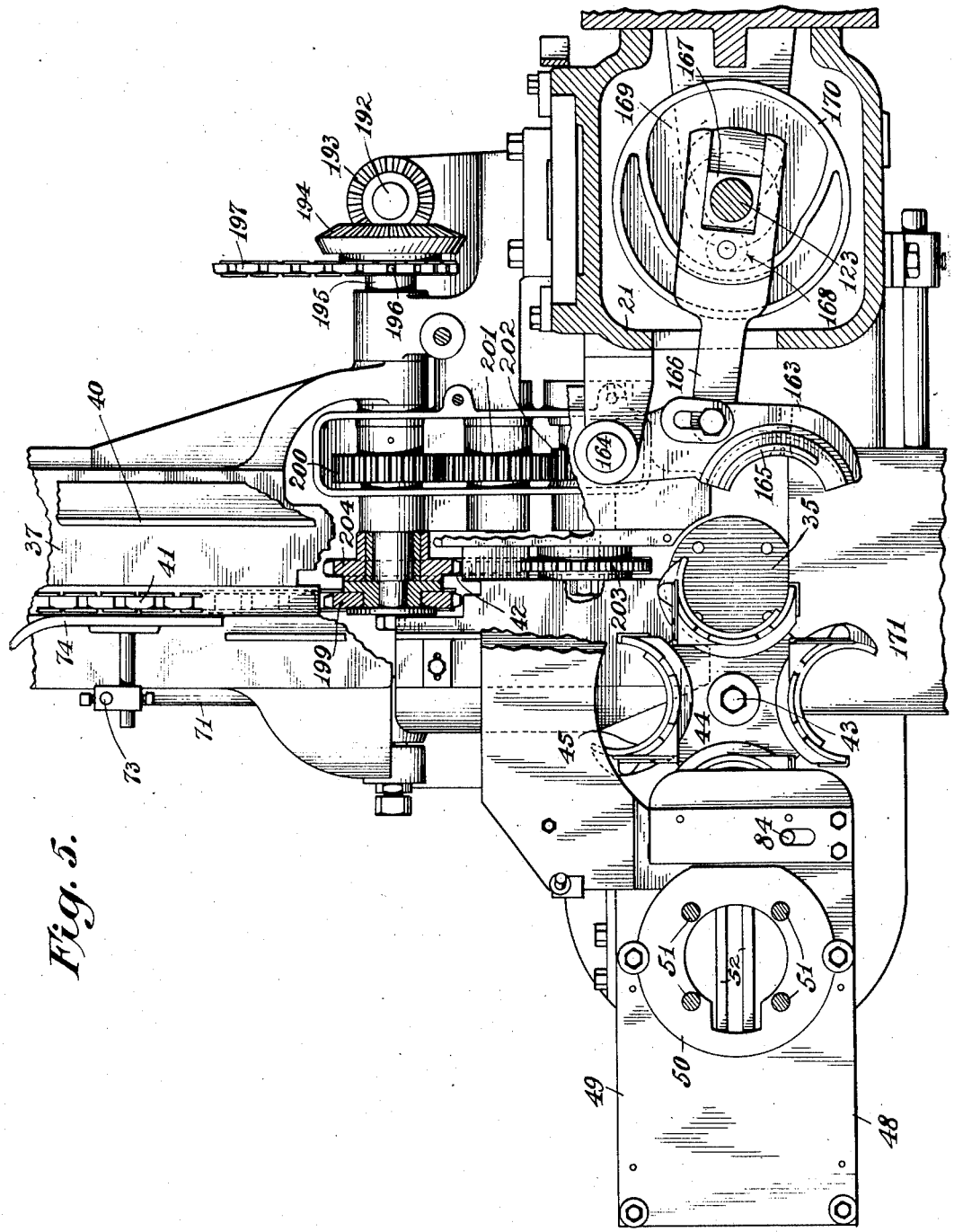

J. BRENZINGER.
CAN AND CAN COVER FEEDING DEVICE FOR CAN HEADING MACHINES.
APPLICATION FILED SEPT. 24, 1917.

1,367,455.

Patented Feb. 1, 1921.
10 SHEETS—SHEET 6.

INVENTOR
Julius Brenzinger
BY
ATTORNEY

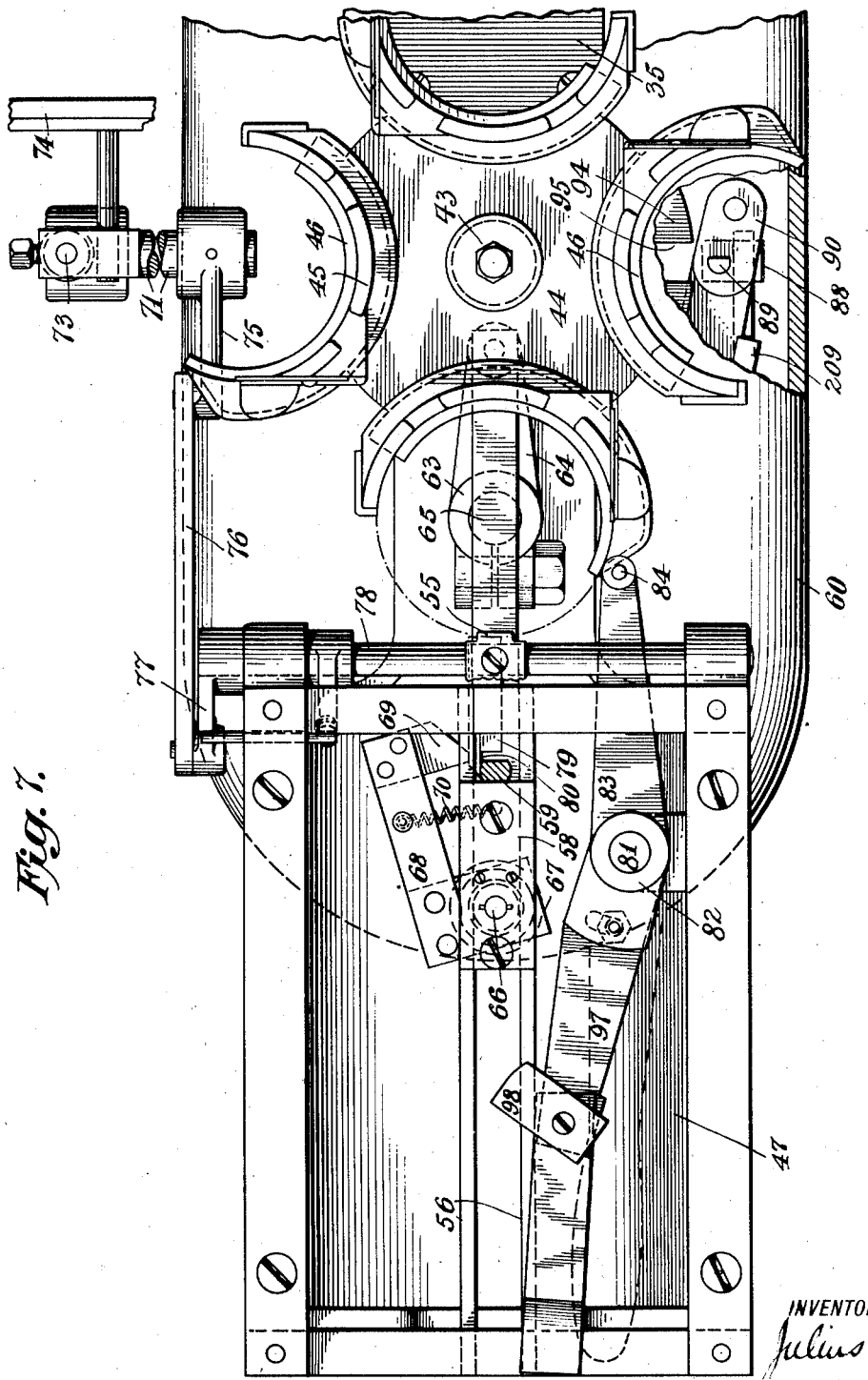

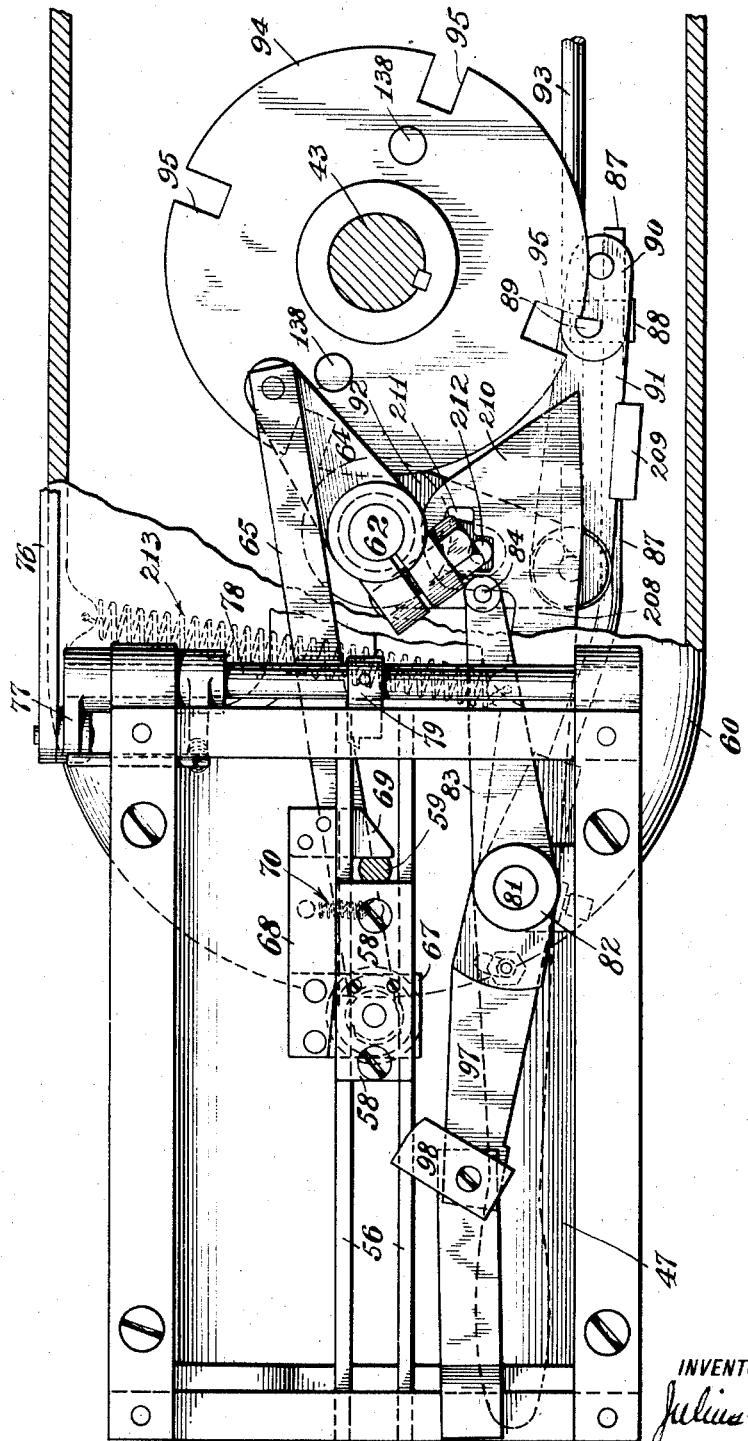

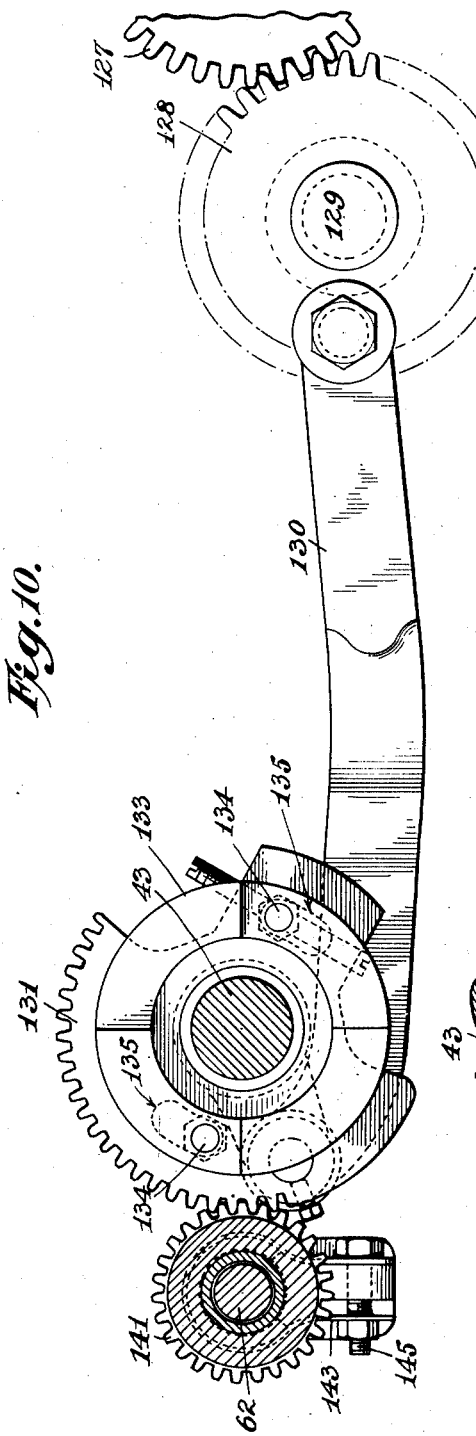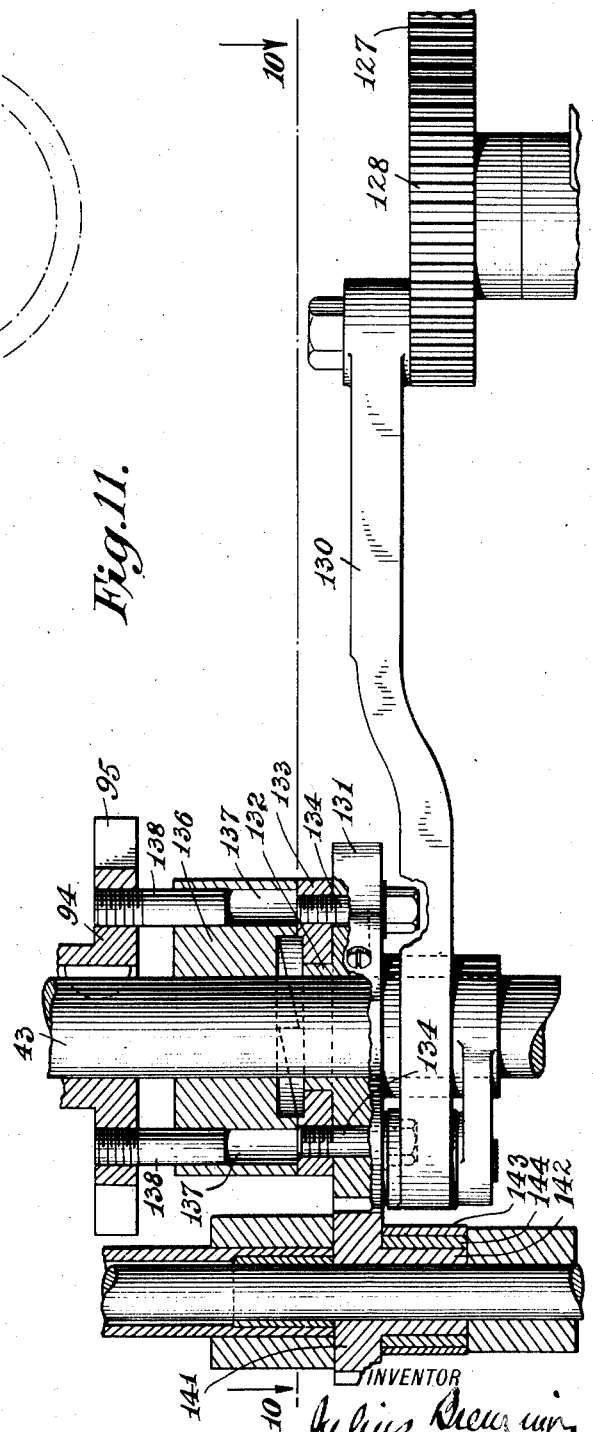

J. BRENZINGER.
CAN AND CAN COVER FEEDING DEVICE FOR CAN HEADING MACHINES.
APPLICATION FILED SEPT. 24, 1917.

1,367,455.

Patented Feb. 1, 1921.
10 SHEETS—SHEET 10.

INVENTOR
Julius Brenzinger
BY
ATTORNEY

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

CAN AND CAN-COVER FEEDING DEVICE FOR CAN-HEADING MACHINES.

1,367,455.      Specification of Letters Patent.      Patented Feb. 1, 1921.

Application filed September 24, 1917. Serial No. 192,916.

*To all whom it may concern:*

Be it known that I, JULIUS BRENZINGER, a citizen of the United States, residing at Fairfield, in the county of Fairfield and State of Connecticut, have invented certain new and useful Improvements in Can and Can-Cover Feeding Devices for Can-Heading Machines, of which the following is a specification.

This invention relates generally to can heading machines, with more particular reference to mechanism appurtenant thereto for successively delivering filled cans to the seaming mechanism and automatically positioning a can head or cover for superposition on the open can prior to the seaming operation, this delivering and positioning mechanism including means whereby, when no can is being conveyed to the seaming mechanism, the cover positioning means becomes at once automatically inoperative, and when the supply of covers becomes depleted, and no cover is in process of being positioned, operation of the can delivering mechanism is automatically checked. The present invention has much in common with that shown and described in my co-pending application filed July 14, 1917, Serial No. 180,505, and while more particularly designed for use in connection with a different type of heading machine proper, may be said in certain respects to be the result of efforts to further improve upon the device of my earlier application aforesaid and upon appurtenances of this character in general.

As is well known, in the packaging of certain kinds of food-stuffs it is necessary to somewhat over-fill the container in order to insure the desired or essential weight or bulk of contents when the can has been headed. Under any ordinary conditions, this results in more or less spilling of the contents of the open can while being rapidly conveyed to the seaming mechanism and while therein and prior to completion of the seaming operation—particularly if the open can in transit is suddenly started and stopped or the direction of movement thereof suddenly changed. In addition to the general objects set forth by me in connection with the invention shown and described in my co-pending application aforesaid, therefore, the present invention has in view not only a more gradual acceleration of the movement of the filled and open can in transit to the seaming mechanism, and the minimizing of the extent of change of direction of movement prior to final positioning in the seaming mechanism, but also the interpositioning of means for compressing the can contents to substantially the desired bulk, without interruption of advancing movement, and at a point where provision may be made for draining away the overflow and thus preventing the same from "mussing' or "gumming up" parts of the machine.

Other objects of the invention will become apparent from the following specification, of which the accompanying drawings form a part, and in these drawings—

Fig. 5 is an enlarged horizontal section taken substantially on the line 5—5 of Fig. 3;

Fig. 7 is a view similar to Fig. 6, but showing the parts in the positions they assume when a cover has been pushed into the turret, no can having been delivered to receive the cover, whereby the cover-feed actuating mechanism has been rendered inoperative and will not feed a cover on its next stroke;

Fig. 8 is a view similar to Fig. 6, but showing the parts in the positions assumed when no cover has been engaged—this condition resulting in the stopping of the machine;

Fig. 10 is an enlarged detail horizontal section, taken substantially on the lines 10—10 of Figs. 3 and 11, showing the means for rotating the turret shaft a quarter turn and transmitting motion to the cover-feed shaft to cause the latter to rotate a half turn;

Fig. 11 is an enlarged side elevation, partly in central section, of the turret clutch, cover-feed shaft and the parts shown in Fig. 9;

Figure 1:
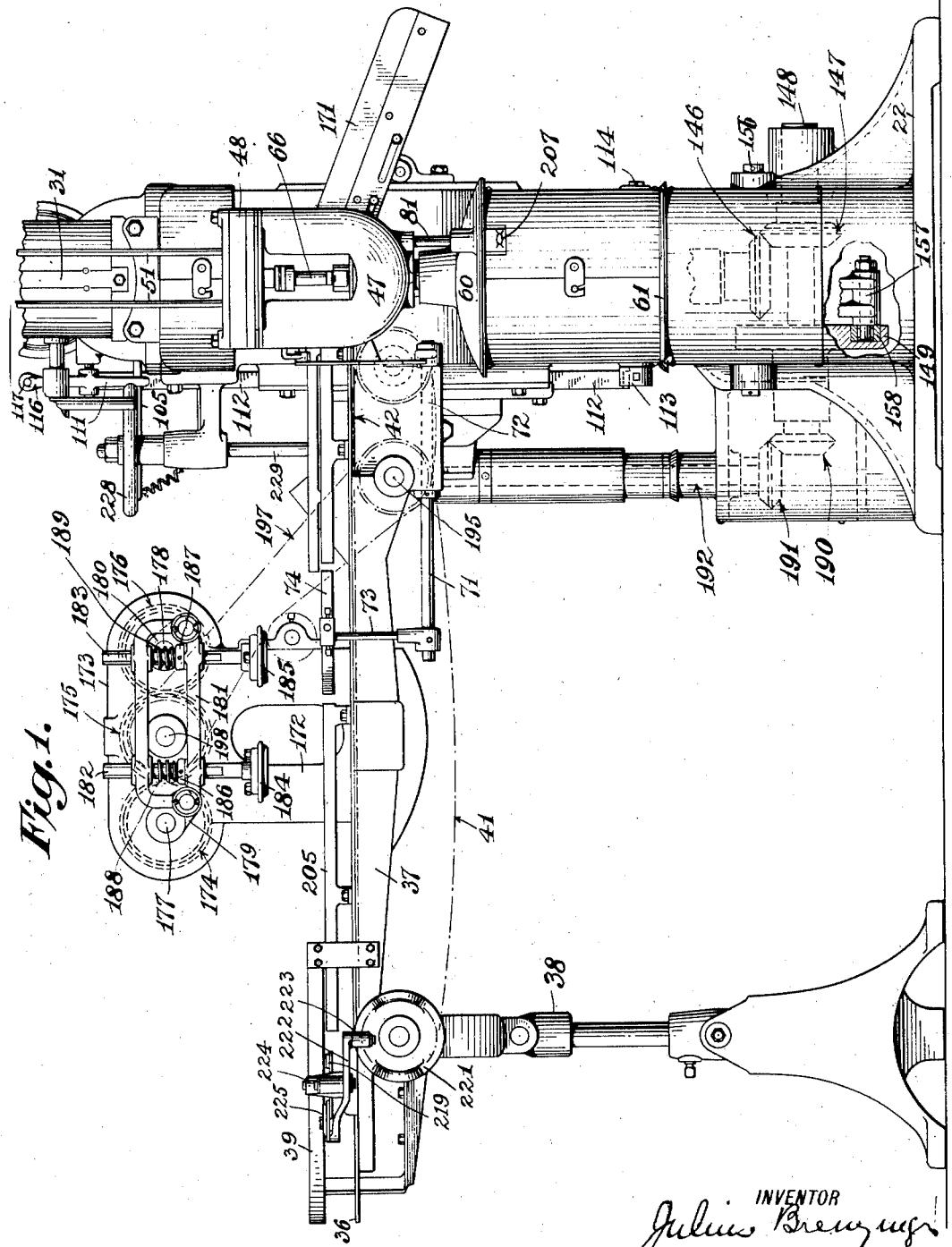
Figure 1 is a front elevation of a machine which I consider a practical and convenient embodiment of my invention.
Figure 12:
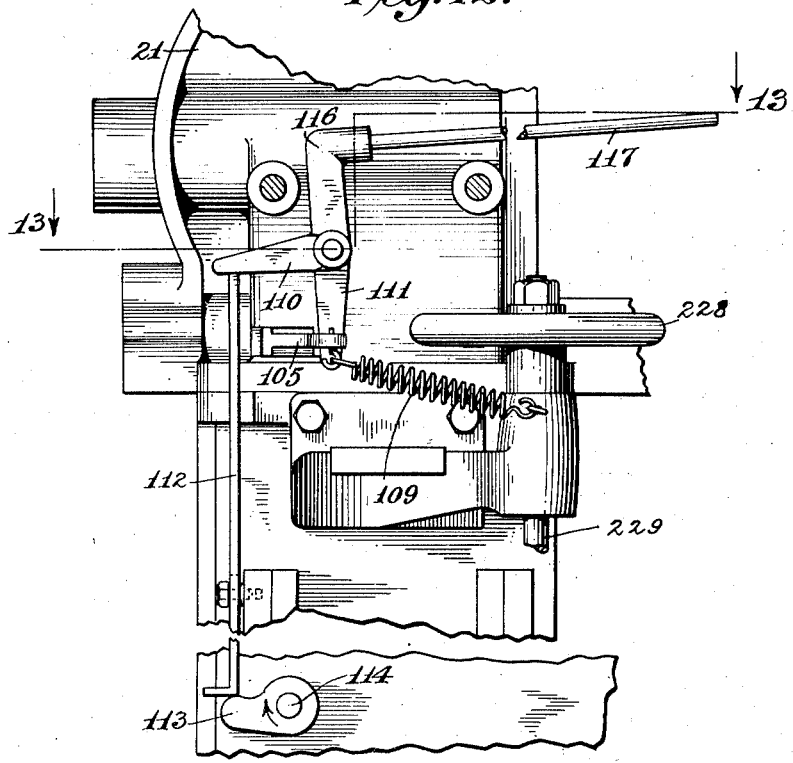
Figure 13:
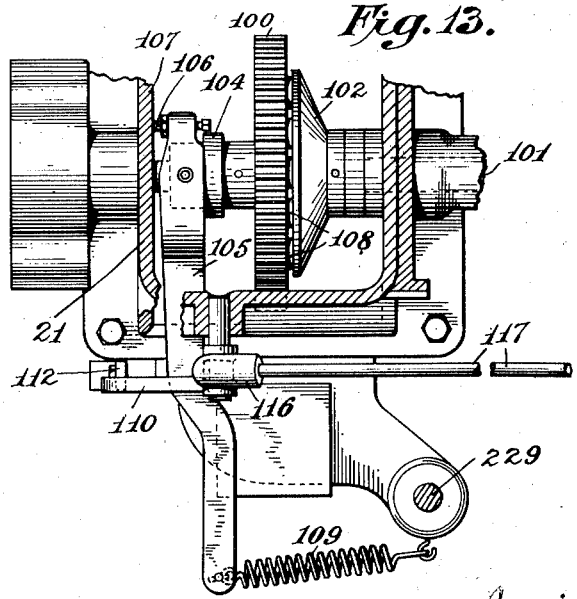

Fig. 12 is an enlarged, fragmentary, detail, side elevation of the body of the machine, looking from the left-hand side as in Fig. 1, showing the mechanism for both automatically and manually throwing out the main drive clutch, and Fig. 13 is a horizontal section taken substantially on the line 13—13 of Fig. 12, the hand wheel (hereinafter described) being omitted and the hand-wheel shaft being shown in section for the purpose of clearer illustration.

Figure 3:
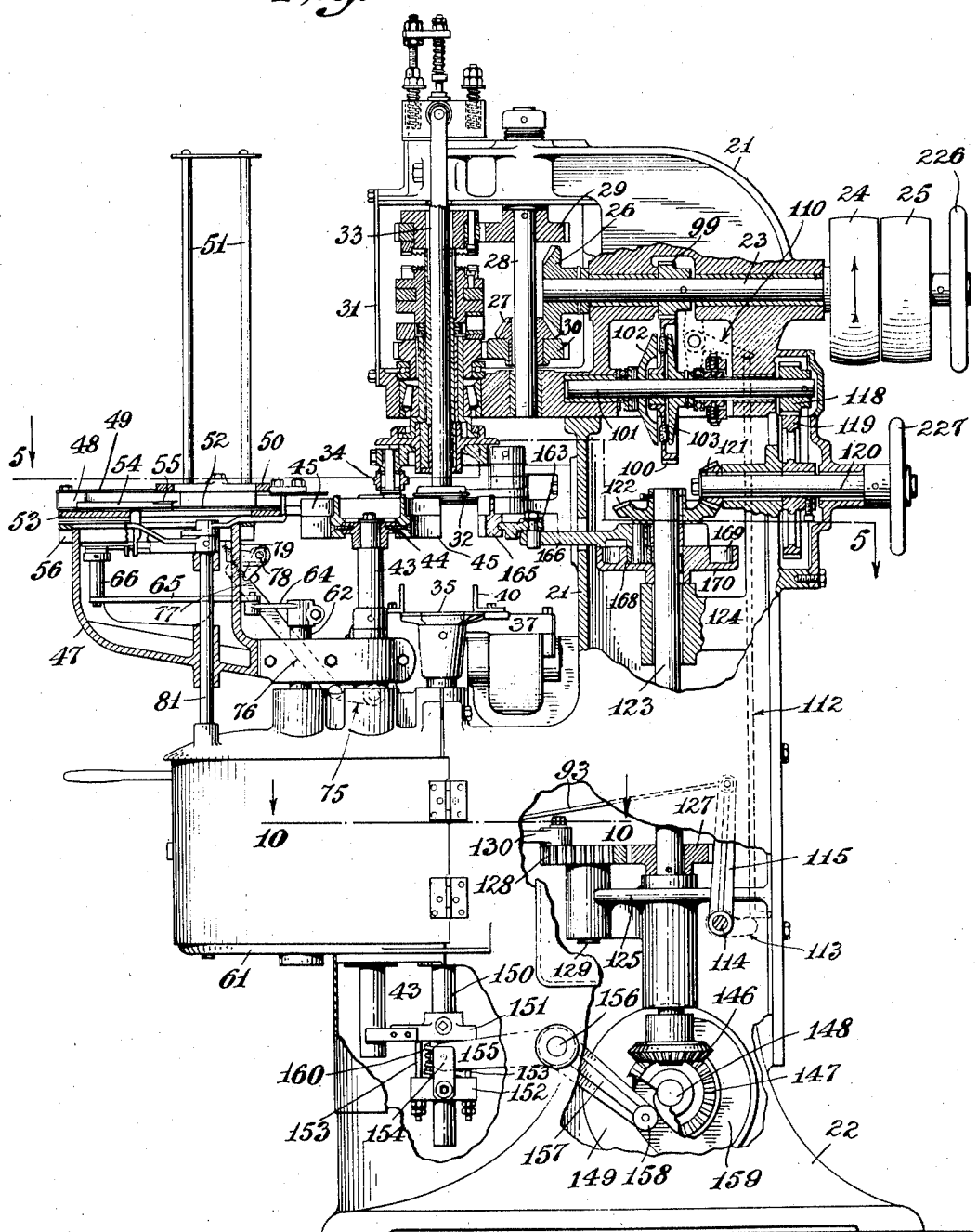
Fig. 3 is a side elevation, partly in section, looking from the right hand as shown in Fig. 1.

The interdependent can and cover feeding devices of the present invention may doubtless be satisfactorily and successfully used in connection with many different types of can-heading machines, but they were especially designed to constitute an appurtenance to a heading machine of the type shown, the seaming and driving mechanisms being carried by a heavy frame 21 stably supported on a base 22, all moving parts being suitably incased as best shown in Fig. 1 but as also indicated in Fig. 3. The main driving shaft 23 is journaled in bearings in the upper part of the frame 21 and is provided with the usual fast and loose pulleys 24 and 25 connected in the usual manner with any suitable source of power. At the inner end of the shaft 23 is mounted the bevel gear 26 in mesh with the bevel gear 27 on the shaft 28 whereby the latter is rotated. The shaft 28 carries the pinions 29 and 30 which actuate the seaming mechanism within the casing 31.

This seaming mechanism includes the chuck 32, mounted at the lower end of the vertically reciprocating chuck-shaft 33 and adapted to enter the depressed portion of the can head or cover and support the same on the flanged can body against the forces of the seaming operation in a common and well-known manner, and two or more seaming rollers 34 (of which one is shown in Fig. 3) adapted to be revolved around the chuck in an orbit which alternately approaches and recedes from the chuck, whereby said rollers are periodically effective to perform the seaming operation. Various parts of this seaming mechanism and its actuating means are shown and described in detail in several prior patents granted to me, particularly Patents Nos. 1,167,346, 1,167,347, 1,167,349 and 1,167,351, all granted on January 4, 1916. As hereinbefore suggested, the seaming mechanism proper and its actuating means specifically form no part of the present invention, and it need only be said, further, that in the absence of a can body with cover superposed in proper position thereon interposed between the vertically reciprocable platform 35 and the chuck 32, and the latter raised by elevation of said platform, the rollers 34 will revolve idly around said chuck, out of contact therewith, but when a can has been delivered to said platform and therethrough the chuck 32 is raised, the revolving rollers 34 are brought into coöperative positional relationship with said chuck and perform the seaming operation in the manner shown and described in detail in my prior patents, aforesaid.

The can feeding mechanism includes a constantly rotating disk or table 36 carried at the end of the frame 37 which is supported at this end by the adjustable standards 38 and at the other end by the frame 21 of the heading machine proper. The filled cans are placed on this table by hand, and are received between suitable guide-strips 39 and 40 which direct the cans to the track provided by the top face of the frame 37. Traveling in a longitudinal slot in this frame or track 37 is an endless chain 41, driven in a manner which will be hereinafter described, and which is provided with a series of equidistantly-disposed, upwardly-projecting lugs or fingers each adapted to engage and advance a can body delivered from the table 36 to the track 37, as shown and described in detail in another prior Patent, No. 1,167,345, granted to me January 4, 1916. Initial movement of the open and over-filled can should be relatively slow, in order to avoid the for many reasons undesirable spilling of the contents thereof, but in order to deliver the open can to the seaming mechanism with sufficient rapidity to secure a desirably profitable output capacity of the machine, this initially slow movement must be accelerated. To effect this acceleration, I provide at the inner end of the track 37 another and a relatively shorter endless chain 42, driven at a higher speed, in a manner which I shall subsequently describe, and also provided with can-engaging lugs or fingers which, however, are obviously spaced apart at greater distances than the lugs or fingers on the chain 41 in view of the greater velocity at which the chain 42 is driven. The cans being advanced along the track 37 by the chain 41 are therefore progressively and successively picked up by the chain 42 and further advanced at accelerated speed.

Suitably journaled in arms projecting forwardly from the frame 21 of the heading machine is a vertical shaft 43, intermittently rotated through arcs of 90° each in a manner to be later described, and having mounted at its upper end a turret 44. This turret 44 is provided with four substantially semicircular pockets or recesses 45 45, equidistantly disposed and each adapted to receive and snugly contain a can body. In the device of my co-pending application, aforesaid, the filled cans were delivered successively in a radial direction to the receiving pockets or recesses of the turret, one of which was always properly positioned to receive a can which was then conveyed to the vertically reciprocating platform by rotation of the turret through an arc of 90°. Obviously, this necessitated a more or less abrupt deflection from the former direction of movement of the can with consequent tendency to spill the contents thereof, and an important consideration in the development of the present invention has been the direct delivery of the filled can to the platform 35 without change in its former direction of movement. I therefore so dispose and arrange the track 37 and the can advancing means as to deliver the cans to the platform 35 tangentially with respect to the turret 44—instead of radially—rotative movement of said turret being so timed that the can body is received within one of the pockets or recesses 45 as said can is delivered to the platform 35—as will be understood from inspection of Fig. 5.

The pockets or recesses 45 of the turret 44 are provided with shoulders 46 46 each adapted to receive and support a can cover and convey the same to position above the platform 35 when a filled can has been delivered to said platform. Therefore, when said platform is raised, with a filled can thereon, the cover is so positioned that it is superposed on the flanged open end of the can and carried therewith into the seaming mechanism and the can headed in the usual manner.

The cover feed mechanism includes a frame or bracket 47, suitably secured to the frame 21 of the heading machine, which carries the elongated shallow casing 48. The upper plate 49 of this casing is provided with an orifice within which is mounted the ring 50 which is slightly greater in internal diameter than the tops or covers which are to be applied to the can bodies. The machine shown and being described is adapted for the heading of so-called "round" cans, and it is to be understood that in connection with a machine for the heading of so-called "square" cans, or cans other than "round" in shape, the internal configuration of the ring 50 would correspond with the general shape or outline of the can head. In this ring 50 are mounted a plurality (preferably four) of posts or rods 51 51, so positioned as to receive and retain in stacked or superposed arrangement a supply of can tops or covers, the stack being supported upon the plates or bars 52 mounted upon the lower plate 53 of the casing 48.

As explained in my co-pending application, aforesaid, these covers are flanged and the edge of the flange is curled to prevent close nesting of the covers when stacked, spacing them apart in such manner that the bottom or lowermost cover of the stack may be engaged by a suitable tool and slidably withdrawn from the stack which, upon withdrawal of the tool, descends by gravity to position another cover for withdrawal by said tool. As in the machine of my earlier application, the cover-feeding tool consists of a pusher-block 54, slidable in the guideway provided by the plates or bars 52 and provided with a preferably removable blade 55 presenting a sharp edge to the stack of covers and adapted to be passed between the lowermost cover and the one next above the same, thereby slightly separating said covers and permitting the slidable withdrawal of the lowermost cover by the end of the advancing pusher 54 and conveyance of said cover to the turret 44 where it is supported upon the shoulder 46 of the contiguous pocket or recess 45. Obviously, during this operation the turret is at rest.

In the machine of my other application, the filled cans being delivered to the turret in a radial direction and along a path rectangularly disposed with respect to the path of movement of the covers, a cover was positioned above the can body to which it was seamed upon each intermittent movement or quadrantal rotation of the turret. Therefore, if there were no succeeding or following can, the cover-feed mechanism was rendered inoperative and no cover was fed to the turret. In the machine of the present application, the filled cans being delivered to the turret in what may be termed a tangential direction and therefore to position in said turret diametrically opposite that where the covers are delivered, two movements or quadrantal rotations of the turret are required to position a cover above the can body to which it is to be seamed. Furthermore, in providing means for the acceleration of movement of the filled cans, as well as on account of the greater distance between the points of delivery of cans and covers, it is inconvenient, if not mechanically impracticable, to control the cover-feed by the can next succeeding the one positioned for the seaming operation. In fact, I have found from experience that it is best under such conditions to control the cover-feed from the third succeeding can, and it will be apparent that in this case covers should have been delivered for two cans in addition to the one positioned for the seaming operation. Therefore, in the absence of a third succeeding can, a cover is still permitted to be delivered to the turret, but the cover-feed mechanism is then rendered inoperative, which I prefer to accomplish by preventing the return of the pusher block to initial position instead of preventing advance thereof upon the next succeeding stroke of its actuating means.

Mounted in the casting which provides the frame 47 are the guide-rails 56 56 upon which is slidable the T-block 58, which, upon what may be termed the advancing stroke thereof, is adapted to engage the pin 59 projecting downwardly from the lower face of the pusher 54 and advance the latter to deliver a cover to the turret 44 in the manner set forth. Suitably journaled in the members 60 and 61, which constitute a frame projecting forwardly from the main frame 21 of the machine, is a vertical shaft 62 fixed at the upper end of which is the collar 63 carrying the crank-arm 64, pivoted to the end of which is the connecting-rod 65 the other end of which is pivoted to the pin or post 66 projecting downwardly from the T-block 58. It will be apparent that when the shaft 62 is rocked, the T-block 58 will be reciprocated along the rails 56.

Pivoted to the lower face of the T-block 58 is the plate 67 carrying the bar 68—chamfered at the pivoted end thereof, as shown, to permit of oscillation thereof against the T-block—to the free end of which is secured a beveled plate 69 which constitutes a hook adapted to engage the pin 59 on the pusher 54 and return the latter to initial position upon return stroke of said T-block 58. A spring 70 in tension between pins on the T-block 58 and the bar 68, respectively, yieldingly retains the hook 69 in engaging position, and it will be apparent that unless the hook is withdrawn from such position the pusher 54 will reciprocate with said T-block.

As shown in Figs. 1 and 5, a rock-shaft 71 is suitably journaled in bearings in the bracket 72 carried by the frame of the machine, and has mounted at its outer end the upwardly projecting arm 73. Fixed upon the upper end of the arm 73 is the presser-bar 74, normally located in the path of movement of the advancing cans on the track 37 and having the outer end thereof curved, substantially as shown, whereby each advancing can in turn impinges against said bar to force the same laterally from the path of movement of the cans and thus oscillate the arm 73 and rock the shaft 71. At the other end of the shaft 71 is mounted the crank-arm 75 to the end of which is pivoted the connecting-rod 76 the other end of which is pivoted to the end of a lever or arm 77 mounted at the end of the shaft 78. This shaft 78 carries the arm 79 the end of which is normally in and at the end of the path of movement of the pin 59 depending from the pusher 54, having a recess 80 for the reception of said pin, as shown in Fig. 7. The narrower or reduced projecting end of said arm 79 is beveled, as shown, and it will be apparent that when the end of the arm is in the path of movement of the pin 59, engagement between the beveled faces of the hook 69 and the arm 79 will cause deflection of said hook against the action of the spring 70, as shown in Fig. 7, and under these conditions the pusher 54 will not be returned with the T-block 58 upon the return stroke of the latter, which will thenceforth reciprocate idly and no further covers will be delivered to the turret 44. On the other hand, if the arm 79 is withdrawn from the path of movement of the pin 59, the hook will continue in or be returned to engagement with the pin 59, as shown in Fig. 8, and the pusher 54 will be returned with the T-block 58 for the delivery of another cover to the turret upon its return stroke.

Figures 4, 9:
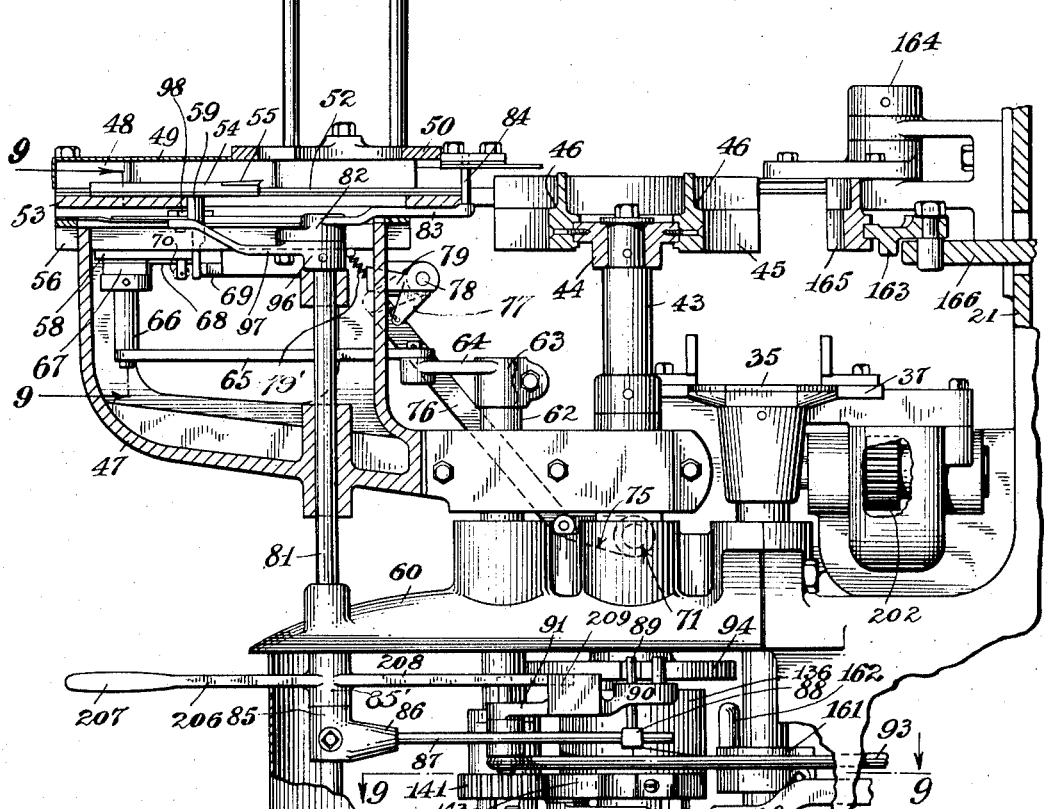
Fig. 4 is an enlarged side elevation, partly in section, of the cover-feed mechanism and adjacent parts.
Fig. 9 is a slightly enlarged vertical section, taken substantially on the line 9—9 of Fig. 4.

It will be seen, therefore, that so long as filled cans are being advanced along the track 37 in regular order, each can in turn, as it passes the bar 74 forces the latter outwardly, operating through the shaft 71, the crank 75, the connecting-rod 76, the arm 77 and the shaft 78 to withdraw the arm 79, whereupon the pusher 54 will return with the T-block 58 and upon its next stroke deliver to the turret 44 a cover for the can which has just passed the bar 74. On the other hand, if no can passes the bar 74, the end of the arm 79 will remain in and at the end of the path of movement of the pin 59, and the T-block will reciprocate idly until the regular advancement of cans along the track 37 is resumed. In short, no cover is delivered to the turret 44 in the absence of a can in said turret to receive the same. The parts are returned to and yieldingly retained in their initial positions, with the bar 74 in its projecting position within the path of movement of the can bodies, by means of a spring 79' in tension between the end of the arm 79 (Fig. 4) and a suitable anchorage on the frame of the machine.

Journaled in bearings in the plates or brackets 60 and 61 is the vertical shaft 81, at the upper end of which is fixed the collar 82 carrying the arm 83, and at the end of this arm is mounted the pin 84. This arm 83 is normally so positioned that the pin 84 is in the path of movement of a cover being advanced by the pusher 54, whereby said pin is engaged by said cover and the arm 83 oscillated to rock the shaft 81. A collar 85 fixed upon the shaft 81 is provided with an arm 86 in which is mounted the rod 87. Slidable on the rod 87 is the block 88 which carries the pin 89 which projects upwardly through the head 90 at the end of the arm 91 pivoted to the end of the arm 92 loosely mounted on the shaft 62, and on the pivot pin is mounted the rod 93, whereby said rod is reciprocated by oscillation of the arm 92.

Figure 6:
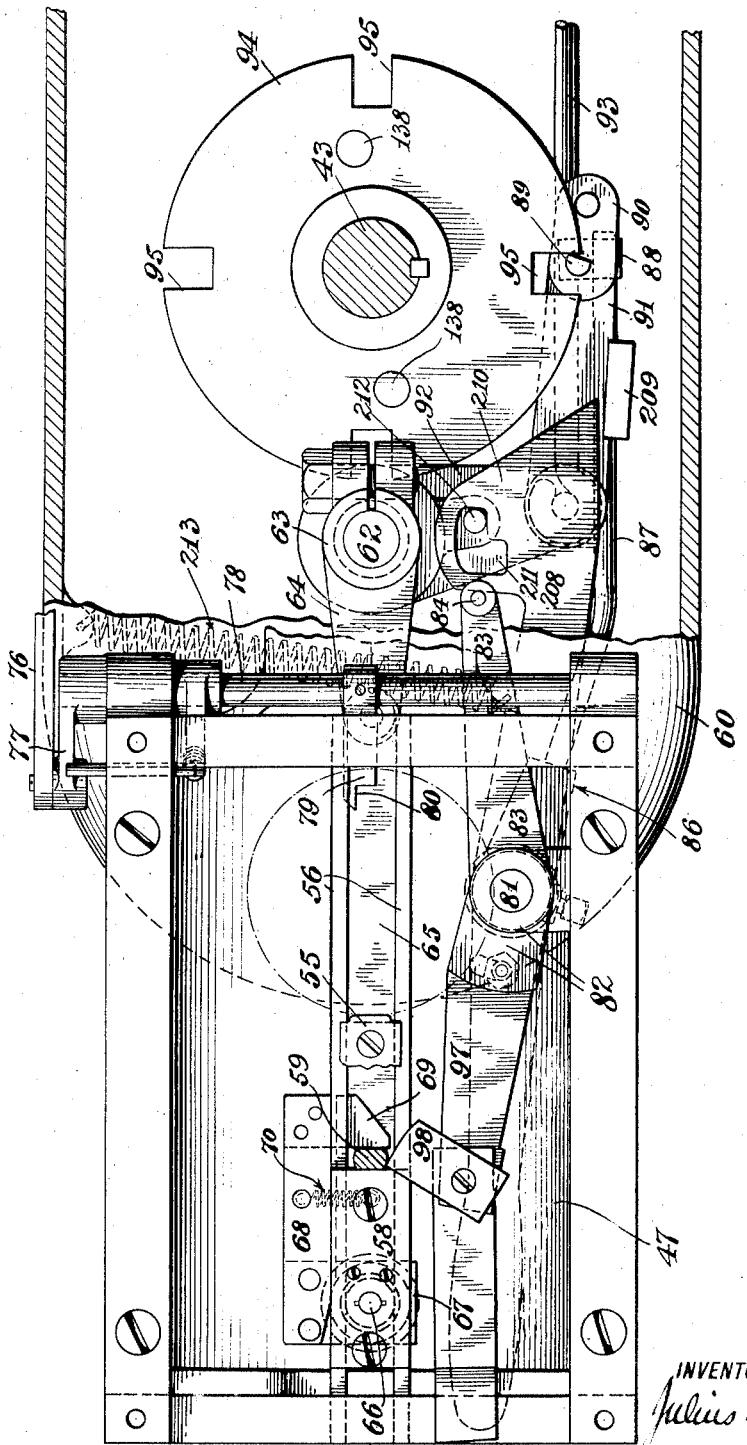
Fig. 6 is an enlarged detail plan view of the cover-feed mechanism, showing the parts in position to feed a cover, the latter being indicated by the broken line circle.

Keyed to the turret shaft 43 is the disk wheel 94 which I have shown provided with four peripheral notches 95 95 equidistantly spaced apart and each adapted to receive and engage the pin 89. Projecting from a collar 96 fixed upon the shaft 81 below the collar 82, is an arm 97 carrying at its free end the pivoted block or plate 98 adapted to be swung into and out of the path of movement of the pin 59. It will be seen, therefore, that when the parts are in the relative positions indicated in Fig. 6, the T-block and pusher being just about to start upon their forward or feeding stroke, the pin 59 has impinged against the slightly tapered edge of the block or plate 98 and rocked the shaft 81 through the arm 97. This movement of the shaft 81 accomplishes two purposes; first, it swings the arm 83 to position where the pin 84 is again interposed in the path of movement of an advancing cover, and, second, the rod 87 is swung in the same direction to carry the pin 89 into one of the recesses or notches 95 in the disk wheel 94—there being such interdependent relationship between all actuating mechanisms, as hereinafter described, that one or another of said notches 95 is always in position to receive the pin 89 when the pin 59 engages the block or plate 98 on the arm 97.

It will now be seen that if a cover is engaged and delivered to the turret, as shown in Fig. 7, the cover has impinged against the pin 84 and this has rocked the shaft 81 in the other direction, which also serves the double purpose of, first, returning the arm 97 to its initial or former position, with the block or plate 98 in the path of movement of the pin 59, and, second, swinging the rod 87 to withdraw the pin 89 from the notch 95 which has contained the same, thereby permitting free movement of the disk wheel 94 and therefore of the turret 44.

Should no cover be advanced by the pusher 54, it will be apparent that the shaft 81 will not be rocked and, therefore, the pin 89 will not be withdrawn from the notch in the disk wheel 94. Under these conditions, when the turret shaft 43 again starts to rotate, the pin 89 will be engaged and operate through the arm 91 to swing the arm 92 and move the rod 93, as indicated in Fig. 8. This rod 93 is designed to release a clutch interposed between the main driving means and both the cover-feed and the can-feed actuating mechanisms, stopping operations of these mechanisms, whereby no cans will be delivered to the seaming mechanism when no covers are being advanced. Obviously, there are many different types of clutches any one of which might be well adapted for my purposes, and countless ways of interposing a clutch in the actuating mechanism. I have found the clutch shown in the drawings, and the manner of its interposition now about to be described, to be the best for all practical purposes, particularly in connection with a can heading machine of the type illustrated.

Mounted on the shaft 23 is the pinion 99 in mesh with the gear 100 loose on the shaft 101 which is journaled in suitable bearings in the frame 21. On one side of the gear 100 is the clutch disk or member 102, fixed upon the shaft 101, and on the other side thereof the clutch disk or member 103 which is feathered on said shaft whereby it is slideable thereon yet rotates therewith. Loose upon the shaft 101 and adjacent to the hub of the clutch disk or member 103 is a collar 104 (Fig. 13) which has a reduced portion providing a shoulder, and to the reduced portion of said collar is pivoted the lever 105. At the end of the lever 105 is provided the adjustable fulcrum-screw 106 acting against the casing 107, whereby upon movement of said lever toward the gear 100 it will press against the shoulder of the collar 104 and clamp said gear between the two clutch disks or members, the web of said gear being provided with a circularly arranged series of friction blocks 108. A spring 109, in tension between the end of the arm or lever 105 and a suitable anchorage on a fixed part of the frame of the machine, operates to yieldingly press said lever 105 against the shoulder of the collar 104 to retain the clutch members in engaging condition.

Pivoted on the outside of the casing 107 are the arms 110 and 111 which constitute a bell-crank lever the arm 111 of which contacts with one side of the lever 105 and is adapted to move said lever against the action of the spring 109 and release the clutch. The arm 110 is in contact with the upper end of a vertically reciprocable rod 112 adapted to be raised by a short arm 113 on the rock-shaft 114 which also carries the arm 115 to the free end of which is pivoted the rod 93. It will be seen, therefore, that when no cover has been delivered to the turret 44 and the pin 89 consequently not withdrawn from the notch in the disk wheel 94, the arm 92 will be oscillated and operate through the arm 93 to release the clutch in the manner described. As both the can-feed and the cover-feed mechanisms are driven from the shaft 101, it will be apparent that when the supply of covers becomes exhausted these mechanisms will be promptly brought to conditions of rest and no more cans be delivered to the seaming mechanism.

I have shown the arm 111 of the clutch-releasing bell-crank lever extended to provide an arm 116 to end of which is secured the rod 117 which projects forwardly to a readily accessible position at the front of the machine where it may be provided with a suitable handle (not shown) and the clutch released at any time by hand.

Mounted at the end of the shaft 101 is a pinion 118 in mesh with a gear 119 on the relatively short shaft 120 which is journaled in suitable bearings in the frame 21. At the inner end of the shaft 120 is mounted the bevel-pinion 121 in mesh with the bevel-gear 122 at the upper end of the vertical shaft 123 which is journaled in bearings in the arms or brackets 124 and 125 on the frame 21. Near the lower end of the shaft 123 is mounted the gear 127 in mesh with a gear 128 at the upper end of a short shaft 129 which has bearings at the end of the arm or bracket 125. On the upper face of the gear 128 is pivoted the crank 130 the other end of which is pivoted to the segmental gear 131 loosely mounted on the turret shaft 43, whereby upon rotation of the gear 128 the segmental gear 131 will be rocked through an arc of 90°. The segmental gear 131 is provided with a hub 132 upon which is mounted the clutch-collar 133 which is adjustably secured to said segmental gear by means of bolts 134 passing through slots 135 in said gear and screwed into (see dotted lines in Fig. 10) said collar. This clutch-collar is provided with four quadrantally disposed teeth (Fig. 10) adapted to be engaged by corresponding teeth on the lower face of the block 136 loose upon the turret-shaft 43. This block 136 is provided with vertical bores 137 137 into which project pins 138 138 depending from the disk wheel 94 which is keyed or otherwise suitably secured to the shaft 43. It will be seen, therefore, that rotation of the block 136 will cause rotation of the shaft 43, and consequently of the disk wheel 94 and the turret 44, although said block is slidable on said shaft. It will now be seen that when, through rotation of the gear 128, the segmental gear 131 has been rotated to the position indicated in Figs. 10 and 11, the teeth in the clutch-collar 133 will have engaged the teeth in the block 136 and through the pins 138 rotated the disk wheel 94 and therewith the turret shaft 43 through an arc 90°. I brake the shaft 43 against over-rotation and against frictional reverse rotation by means of a brake-band 139 (Fig. 4) tightened upon said shaft through the interposition of a suitable friction-pad by means of the screw-bolt 140. This is a common and well-known expedient and need not be further described here, although it may be stated that it is substantially the same in construction and operation as the brake shown in Figs. 9 and 10 in connection with the shaft 62, which will be hereinafter described.

It will be seen, therefore, that upon reverse rotation of the segmental gear 131 with its clutch-collar 133, the block 136 being yieldingly held against rotation therewith, said block will be raised, riding up the inclined faces of the teeth of the clutch-collar and dropping back into engagement with said teeth after said segmental gear has been rotated through an arc of 90°. In this manner the turret-shaft 43 is intermittently rotated through arcs of 90° each for the purposes hereinbefore set forth, and each quadrantal rotation of the turret 44 properly timed.

The teeth of the segmental gear 131 are in mesh with the teeth of a gear 141 mounted on the shaft 62, and the pitch of these gears is so proportioned that the gear 141—and, consequently, the shaft 62—is rotated through an arc of substantially 180° upon rotation of the segmental gear 131 through an arc of 90°. The gears 131 and 141 being thus interlocked for interdependent rotation, I insure against over-rotation of these parts by providing the gear 141 with a hub 142 and surrounding said hub with a brake-band 143 with the interposition of a friction pad 144, and adjustably tightening said band by means of a screw-bolt 145. It will now be apparent that upon rotation of the segmental gear 131 through an arc of 90°, the gear 141 will be rotated through an arc of 180°, rotating therewith the shaft 62 and operating through the crank 64 to reciprocate the T-block 58 and therewith the pusher 54 for the purpose set forth.

Mounted at the lower end of the shaft 123 is a bevel gear 146 in mesh with a corresponding gear 147 on a short shaft 148 which carries the cam disk 149. The can-receiving platform 35 is mounted at the upper end of the vertical rod or stem 150 which has slide bearings in the arms or brackets 60 and 61 of the frame of the machine. To properly press the filled can with its superposed cover against the chuck 32 for the seaming operation, the rod or stem 150 should be yieldingly reciprocable, and I therefore mount upon said rod or stem a fixed collar 151 below which is the loose collar 152 provided with pins 153 which project upwardly and have slide bearings in the collar 151. The loose collar 152 is supported by the link 154 and its operative counterpart (not shown) at the ends of the arms 155 on the short rock-shaft 156 which also carries a lever 157 having a roller 158 at the end thereof adapted to travel in the cam groove 159 in the disk wheel 149. A compression spring 160 is interposed between the collars 151 and 152, and it will be apparent that when the shaft 156 is rocked by oscillation of the lever 157, the rod or stem 150 will be reciprocated. Of course, the parts are initially so relatively adjusted and positioned as to insure elevation of the platform 35 immediately following the delivery of the filled can to said platform. The cam groove 159 in the disk 149 is of such configuration as to hold the platform 35 in its raised position for a sufficient period of time to complete the seaming operation, and to retain said platform in its lowered position for a sufficient period of time to permit the discharge therefrom of a headed can and the delivery thereto of a filled can.

It will be apparent that when a filled can, which is located in one of the pockets or recesses 45 of the turret 44, is raised by the platform 35 for the seaming operation, said turret should be locked against premature or untimely rotation. Therefore, I mount upon the rod or stem 150 a fixed collar 161 carrying a pin 162 so relatively located as to enter and be retained in one of the notches 95 in the disk wheel 94 when said rod or stem 150 is raised to elevate the platform 35. In this manner, the disk wheel 94, and therefore the turret shaft 43, are locked against movement until the rod or stem 150 is depressed or lowered after completion of the seaming operation.

The truing and centering device comprises an arm 163 pivoted at 164 to a fixed arm or bracket projecting from the frame 21, which arm 163 is provided with a pocket or recess 165 corresponding to each of the pockets 45 in the turret 44. This arm 163 is oscillated and the oscillations thereof properly timed by means of a connecting-rod 166 adjustably pivoted to said arm, the other end of said connecting-rod being provided with a yoke which spans the shaft 124 through the interposition of the slide-bearing block 167. This connecting-rod is provided with a roller 168 adapted to travel in the cam-groove 169 of the disk wheel 170 keyed to the shaft 123. It will be seen that the arm 163 will be oscillated from the shaft 123, and the configuration of the cam-groove 169 is such that the truing and centering arm is moved toward the platform 35 immediately following delivery to the latter of a filled can, being retained in this position and loosely engaging the can body while the latter is being raised and until it is ready to be lowered after the seaming operation, when said arm is returned to the position indicated in Fig. 5, in which position it is retained during discharge of the headed can from the platform and delivery to said platform of the next succeeding can to be headed.

Upon withdrawal of the arm 163 and the next succeeding intermittent rotation of the turret 44, the headed can is delivered upon an inclined chute 171 for conveyance to a desired point of ultimate delivery.

Mounted upon one of the track bars 37 is the frame 172 carrying the casing 173 within which are mounted the intermeshed gears 174, 175 and 176. The shaft 177 which carries the gear 174 and the shaft 178 which carries the gear 176 project out of the casing 173 and are provided with crank-arms 179 and 180, respectively, which extend over the track 37. Mounted at the ends of these cranks is a frame 181 in which are provided slide bearings for the rods or stems 182 and 183. These rods or stems carry at their lower ends what may be termed presser-heads 184 and 185, respectively. As was hereinbefore suggested, the cans are generally more or less over-filled in order to secure the desired ultimate weight or bulk. This, of course, in the absence of means for compressing the can contents, would result in the spilling or "slopping over" of the can contents, not only while the open cans were in transit to the seaming mechanism, but also while operated upon in the seaming mechanism, with consequences as hereinbefore set forth.

The presser-heads 184 and 185 are of such size and configuration as to enter the mouths of the cans in transit, without interruption of advancing movement, and thus compress the can contents and practically insure against subsequent spilling thereof. While I have not attempted to illustrate in the drawings any form of trap or catch-basin for such portions of the contents of the over-filled cans as may be forced therefrom through operations of said presser-heads, it will be apparent that any common and well-known form of device of this character may be provided at this point.

The rods or stems 182 and 183 are provided with fixed collars 186 and 187, respectively, interposed between which and the bearings in the upper bar of the frame 181 are the compression springs 188 and 189. It will be seen, therefore, that while movement of the frame 181 through rotation of crank-arms 179 and 180 tends to cause movements in corresponding circular orbits of the presser-heads 184 and 185, the positions of these heads relative to the tops of the advancing cans may be made such that during forward stroke of said heads they will be raised by the can tops against the action of the springs 188 and 189 and travel for a short distance a rectilineal path, thus retaining the can contents under compression for an appreciable period of time.

The shaft 148—which, as has been described, is driven from the shaft 123 through the intermeshed bevel gears 146 and 147—carries the bevel gear 190 in mesh with a corresponding gear 191 at the lower end of a vertical shaft 192 suitably journaled in bearings in the frame of the machine (see dotted lines in Fig. 1). At the top of the shaft 192 is mounted the bevel pinion 193 in mesh with the bevel gear 194 at the end of a shaft 195. This shaft 195 carries a sprocket-wheel 196 around which passes the chain 197 which also passes around a sprocket-wheel (not shown) on the shaft 198 mounted in the casing 173, which shaft carries within said casing the intermediate gear 175 of the train 174, 175 and 176. In this manner, the shafts 177 and 178 are rotated to actuate the presser-heads 184 and 185.

Mounted at the other end of the shaft 195 is the sprocket-wheel 199 around which passes the chain 41, whereby said chain is driven to advance the cans from the table 36. On the shaft 195 is also mounted a gear 200 in mesh with an idler gear 201 which, in turn, is in mesh with a gear 202 on the shaft upon which is mounted the sprocket 203 around which, and around the sprocket 204 loose upon the shaft 195, passes the chain 42. The pitch of the gears 200, 201 and 202 is so proportioned as to drive the chain 42 at substantially twice the velocity of the chain 41, and at substantially the same velocity as that of the turret during intermittent rotation of the latter, whereby each filled can is directly delivered by the chain 42 to the platform 35 tangentially with respect to the rotating turret, the corresponding velocities and the corresponding timing of relative movements insuring the passing of the can body into its receiving pocket or recess 45 in the turret 44 as it is delivered to the platform 35 without deflection from a rectilineal path of movement.

While the guide-rail 40, extending along the track 37 opposite the presser-bar 74, operates to prevent deflection of the advancing cans when the latter engage said presser-bar, it will also be noted that during such engagement the forward presser-head 185 is performing the function described, thus enhancing the positiveness of actuation of the presser-bar 74 without danger of distortion of the can body. A guide-rail 205 is provided to receive the cans directed to the track 37 from the table 36 by the guide-rail 39.

It will be apparent that at times it becomes desirable to check operation of both can and cover feeding mechanisms by hand, and for this purpose I loosely mount upon the shaft 81 above the fixed collar 85 a collar 85' carrying a lever 206 having a suitable handle 207 projecting to a readily accessible position in front of the machine, said collar 85' also carrying the arm 208 the end of which is in position to engage the block 209 on the arm 91, whereby this arm 91 may be oscillated by the handle 207 to withdraw the pin 89 from the notch 95 in the disk wheel 94 and thus permit operation of the clutch releasing mechanism in the same manner as that described in connection with the automatic release thereof.

At the end of the arm 208 is provided a head or enlarged portion 210 having an L-shaped slot 211 therein into which projects a pin 212 projecting upwardly from the clutch-releasing arm 92. A tension spring 213 tends to yieldingly impel the arm 208 in the direction of the pin 212, and it will be apparent that when a cover is being delivered to the turret 44 and the pin 89 is thereby withdrawn from the notch 95 in the disk wheel 94, the arm 92 will not be moved and the parts will remain in the relative positions indicated in Fig. 6. However, when no cover has been delivered and the pin 89 remains in the notch in the disk wheel 94, as hereinbefore explained the arm 92 will be oscillated and upon movement thereof to release the clutch the spring 213 will operate to swing the arm 208 to the position indicated in Fig. 8, whereby the pin 212 is engaged in the off-set portion of the slot 211 to lock the arm 92 in clutch-releasing position and thus prevent premature restoration of the clutch members to operative positions. The slot 211 is of sufficient width to allow the end of the arm 208 to engage the block 209, so as to move the lever 91 to disengage the pin 89 from one of the notches 95, and it will be seen, therefore, that movement of the arm 208 against the action of the spring 213 through manual movement of the handle 207, serves not only to withdraw the pin 89 from the slot 95 in the disk wheel, 94, but also to permit the restoration of the positional relationship between the slot 211 and the pin 212 indicated in Fig. 6, enabling resumption of operations of cover and can feeding mechanisms.

Figure 2:
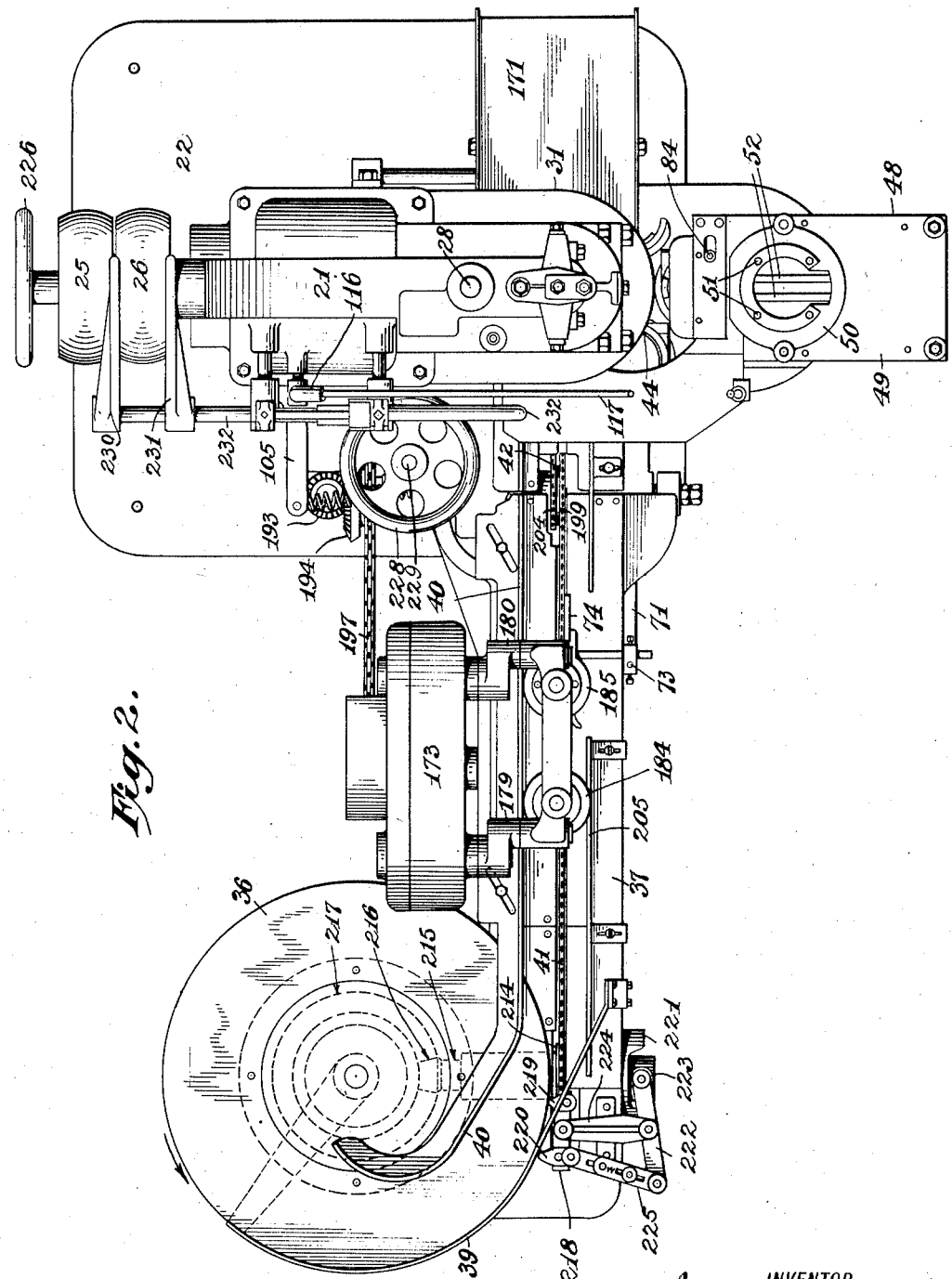
Fig. 2 is a top plan view thereof.

The rotating table 36 is driven by the chain 41 which passes around the sprocket 214 (Fig. 2) on the shaft 215 which carries a bevel-pinion 216 in mesh with a bevel-gear 217 which has suitable connection with the table 36 (see dotted lines in Fig. 2). Of course, the filled cans are placed upon the table 36 more or less indiscriminately, and means should be provided to prevent too rapid delivery thereof to the track 37—as well as to insure proper timing of the deliveries. For this purpose, I pivot at the outer end of the track 37 the bar 218, carrying at one end the stop 219 and at the other end the stop 220. It will be apparent that upon oscillation of the bar 218 one or the other of these stops will be interposed in the path of movement of the cans being conveyed to the track 37 from the table 36. At the outer end of the shaft 215 I provide a cam 221 to actuate the lever 222 through the roller 223 which rides upon the cam track, this lever being fulcrumed at the end of the fixed link 224 and being pivoted at its other end to the arm 225 which has pivotal connection with the end of the bar 218 to oscillate the latter upon operation of the lever 222.

When these parts are in the relative positions indicated in Fig. 2, it will be apparent that the stop 219 will check delivery of a can from the table 36 to the track 37, the checked can holding back following cans, all of which remain at rest with the continuously rotating table 36 sliding underneath the same. At the proper time, the cam 221 actuates the lever 222 to withdraw the stop 219, at the same time interposing the stop 220, whereby the foremost can is permitted to pass to the track 37 but the remaining cans withheld by said stop 220. Immediately thereafter, the cam 221 is brought to position where the lever 222 may be turned to the position indicated in Fig. 2, which is accomplished by the pressure of the next succeeding can against the stop 220 which forces the stop 220 from its path of movement and in so doing renders operative the stop 219 which again checks the same until the next succeeding operation of the lever 222 by the cam 221.

It will be apparent, of course, that the table 36 may be rotated at a lesser velocity than the velocity of the conveyer chain 41, as the cans may be placed upon said table in closer arrangement, and I am in this manner enabled to still further graduate the acceleration of advancing movement of said cans.

I have shown hand-wheels 226 and 227 mounted on the shafts 23 and 120, respectively, to facilitate relative adjustment of parts by hand without application of power, and I have also shown a hand-wheel 228 (Figs. 1 and 2) mounted at the top of a vertical shaft 229 and adapted to raise and lower one end of the track 37—the other end of said track being adapted to be raised and lowered through the adjustable standard 38—in order to adapt the can feeding mechanism to cans of different heights, but as this feature forms no part of the present invention there is no necessity for detailed description thereof in this specification.

Of course, I provide a belt shifter, consisting of the arms 230 and 231 mounted on the rod 232 (Fig. 2), but as this is a common and well known expedient no further description thereof is necessary.

Many modifications of minor details of my improved can and can-cover feeding device for can heading machines will doubtless readily suggest themselves to those skilled in the art to which it appertains, and I therefore do not desire to limit my invention to the specific construction herein shown and described.

I claim as new and desire to secure by Letters Patent:

1. In a machine of the character described, the combination, with means for vertically positioning open containers successively in the seaming mechanism of a heading machine, means for successively delivering said containers to said positioning means at accelerated speed and without deflection from a rectilineal path of movement, and coöperating means for receiving and centering the delivered containers, of means for automatically positioning a head or cover for reception by each container in turn during vertical movement thereof in said container positioning means, said cover positioning means also forming part of said receiving and centering means.

2. In a machine of the character described, the combination, with means for vertically positioning open containers successively in the seaming mechanism of a heading machine, means for successively delivering said containers to said positioning means at accelerated speed and without deflection from a rectilineal path of movement, and coöperating means for receiving and centering the delivered containers, of means for automatically positioning a head or cover for reception by each container in turn during vertical movement thereof in said container positioning means, said cover positioning means also forming part of said receiving and centering means and means for delivering heads or covers successively to said cover positioning means.

3. In a machine of the character described, the combination, with intermittently actuated means for vertically positioning open containers successively in the seaming mechanism of a heading machine, continuously actuated means for successively delivering said containers to said positioning means at accelerated speed and without deflection from a rectilineal path of movement, and coöperating means for receiving and centering the delivered containers, of intermittently actuated means for automatically positioning a head or cover for reception by each container in turn during vertical movement thereof in said container positioning means, said cover positioning means also forming part of said receiving and centering means.

4. In a machine of the character described, the combination, with intermittently actuated means for vertically positioning open containers successively in the seaming mechanism of a heading machine, continuously actuated means for successively delivering said containers to said positioning means at accelerated speed and without deflection from a rectilineal path of movement, and coöperating means for receiving and centering the delivered containers, of intermittently actuated means for automatically positioning a head or cover for reception by each container in turn during vertical move-means, said cover positioning means also forming part of said receiving and centering means, and intermittently actuated means for delivering heads or covers successively to said cover positioning means.

5. In a machine of the character described, the combination, with means for vertically positioning open containers successively in the seaming mechanism of a heading machine, and means for successively delivering said containers to said positioning means without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means.

6. In a machine of the character described, the combination, with means for vertically positioning open containers successively in the seaming mechanism of a heading machine, and means for successively delivering said containers to said positioning means without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, and means for delivering heads or covers successively to said turret.

7. In a machine of the character described, the combination, with intermittently actuated means for vertically positioning open containers successively in the seaming mechanism of a heading machine, and continuously actuated means for successively delivering said containers to said positioning means without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means.

8. In a machine of the character described, the combination, with intermittently actuated means for vertically positioning open containers successively in the seaming mechanism of a heading machine, and continuously actuated means for successively delivering said containers to said positioning means without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, and means for delivering heads or covers successively to said turret.

9. In a machine of the character described, the combination, with means for vertically positioning open containers successively in the seaming mechanism of a heading machine, and means for successively delivering said containers to said positioning means at accelerated speed and without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means.

10. In a machine of the character described, the combination, with means for vertically positioning open containers successively in the seaming mechanism of a heading machine, and means for successively delivering said containers to said positioning means at accelerated speed and without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, and means for delivering heads or covers successively to said turret.

11. In a machine of the character described, the combination, with intermittently actuated means for vertically positioning open containers successively in the seaming mechanism of a heading machine, and continuously actuated means for successively delivering said containers to said positioning means at accelerated speed and without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means.

12. In a machine of the character described, the combination, with intermittently actuated means for vertically positioning open containers successively in the seaming mechanism of a heading machine, and continuously actuated means for successively delivering said containers to said positioning means at accelerated speed and without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, and means for delivering heads or covers successively to said turret.

13. In a machine of the character described, the combination, with means for vertically positioning open containers successively in the seaming mechanism of a heading machine, means for successively delivering said containers to said positioning means at accelerated speed and without deflection from a rectilineal path of movement, and coöperating means for receiving and centering the delivered containers, of means for automatically positioning a head or cover for reception by each container in turn during vertical movement thereof in said container positioning means, said cover positioning means also forming a part of said receiving and centering means, means for retaining in stacked arrangement a plurality of heads or covers, and means for successively withdrawing the bottom cover of the stack and delivering the same to said cover positioning means.

14. In a machine of the character described, the combination with intermittently actuated means for vertically positioning open containers successively in the seaming mechanism of a heading machine, continuously actuated means for successively delivering said containers to said positioning means at accelerated speed and without deflection from a rectilineal path of movement, and coöperating means for receiving and centering the delivered containers, of intermittently actuated means for automatically positioning a head or cover for reception by each container in turn during vertical movement thereof in said container positioning means, said cover positioning means also forming part of said receiving and centering means, means for retaining in stacked arrangement a plurality of heads or covers, and means for successively withdrawing the bottom cover of the stack and delivering the same to said cover positioning means.

15. In a machine of the character described, the combination, with means for vertically positioning open containers successively in the seaming mechanism of a heading machine, and means for successively delivering said containers to said positioning means without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, means for retaining in stacked arrangement a plurality of heads or covers, and means for successively withdrawing the bottom cover of the stack and delivering the same to said turret.

16. In a machine of the character described, the combination, with intermittently actuated means for vertically positioning open containers successively in the seaming mechanism of a heading machine, and continuously actuated means for successively delivering said containers to said positioning means without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, means for retaining in stacked arrangement a plurality of heads or covers, and means for successively withdrawing the bottom cover of the stack and delivering the same to said turret.

17. In a machine of the character described, the combination, with means for vertically positioning open containers successively in the seaming mechanism of a heading machine, and means for successively delivering said containers to said positioning means at accelerated speed and without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, means for retaining in stacked arrangement a plurality of heads or covers, and means for successively withdrawing the bottom cover of the stack and delivering the same to said turret.

18. In a machine of the character described, the combination, with intermittently actuated means for vertically positioning open containers successively in the seaming mechanism of a heading machine, and continuously actuated means for successively delivering said containers to said positioning means at accelerated speed and without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, means for retaining in stacked arrangement a plurality of heads or covers, and means for successively withdrawing the bottom cover of the stack and delivering the same to said turret.

19. In a machine of the character described, the combination, with means for processionally advancing at accelerated speed open-ended can bodies to mechanism for heading the same, and means for automatically delivering successively and positioning for superposition thereon can heads or covers, of means for automatically checking operation of said advancing means in the absence of a head or cover in said delivering and positioning means.

20. In a machine of the character described, the combination, with means for processionally advancing at accelerated speed open-ended can bodies to mechanism for heading the same, and means for automatically delivering successively and positioning for superposition thereon can heads or covers, of means for automatically checking operation of said delivering and positioning means in the absence of a can body in said advancing means, and means for automatically checking operation of said advancing means in the absence of a head or cover in said delivering and positioning means.

21. In a machine of the character described, the combination, with means for successively positioning open containers in the seaming mechanism of a heading machine, and means for delivering containers at accelerated speed to said positioning means, of means automatically actuated for positioning a head or cover for reception by each container during movement thereof in said first-mentioned positioning means, and means for automatically checking operation of said cover positioning means in the absence of a container in said delivering means.

22. In a machine of the character described, the combination, with means for successively positioning open containers in the seaming mechanism of a heading machine, and means for delivering containers at accelerated speed to said positioning means, of means automatically actuated for positioning a head or cover for reception by each container during movement thereof in said first-mentioned positioning means, and means for automatically checking operation of the container delivering means in the absence of a head or cover in said cover positioning means.

23. In a machine of the character described, the combination, with means for successively positioning open containers in the seaming mechanism of a heading machine, and means for delivering containers at accelerated speed to said positioning means, of means automatically actuated for positioning a head or cover for reception by each container during movement thereof in said first-mentioned positioning means, means for automatically checking operation of said cover positioning means in the absence of a container in said delivering means, and means for automatically checking operation of the container delivering means in the absence of a head or cover in said cover positioning means.

24. In a machine of the character described, the combination, with means for successively positioning open containers in the seaming mechanism of a heading machine, and means for delivering containers at accelerated speed to said positioning means without deflection from a rectilineal path of movement, of means automatically actuated for positioning a head or cover for reception by each container during movement thereof in said first-mentioned positioning means, and means for automatically checking operation of said cover positioning means in the absence of a container in said delivering means.

25. In a machine of the character described, the combination, with means for successively positioning open containers in the seaming mechanism of a heading machine, and means for delivering containers at accelerated speed to said positioning means without deflection from a rectilineal path of movement, of means automatically actuated for positioning a head or cover for reception by each container during movement thereof in said first-mentioned positioning means, and means for automatically checking operation of the container delivering means in the absence of a head or cover in said cover positioning means.

26. In a machine of the character described, the combination, with means for successively positioning open containers in the seaming mechanism of a heading machine, and means for delivering containers at accelerated speed to said positioning means without deflection from a rectilineal path of movement, of means automatically actuated for positioning a head or cover for reception by each container during movement thereof in said first-mentioned positioning means, means for automatically checking operation of said cover positioning means in the absence of a container in said delivering means, and means for automatically checking operation of the container delivering means in the absence of a head or cover in said cover positioning means.

27. In a machine of the character described, the combination, with means for vertically positioning open containers successively in the seaming mechanism of a heading machine, means for successively delivering said containers to said positioning means at accelerated speed and without deflection from a rectilineal path of movement, and coöperative means for receiving and centering the delivered containers, of means for automatically positioning a head or cover for reception by each container in turn during vertical movement thereof in said container positioning means, said cover positioning means also forming part of said receiving and centering means, means for delivering heads or covers successively to said cover positioning means, and means for automatically rendering said cover delivering means inoperable in the absence of a container in said container delivering means.

28. In a machine of the character described, the combination, with means for vertically positioning open containers successively in the seaming mechanism of a heading machine, means for successively delivering said containers to said positioning means at accelerated speed and without deflection from a rectilineal path of movement, and coöperative means for receiving and centering the delivered containers, of means for automatically positioning a head or cover for reception by each container in turn during vertical movement thereof in said container positioning means, said cover positioning means also forming part of said receiving and centering means, means for delivering heads or covers successively to said cover positioning means, and means for automatically checking movement of all delivering and positioning means in the absence of a head or cover in said cover delivering means.

29. In a machine of the character described, the combination, with means for vertically positioning open containers successively in the seaming mechanism of a heading machine, means for successively delivering said containers to said positioning means at accelerated speed and without deflection from a rectilineal path of movement, and coöperative means for receiving and centering the delivered containers, of means for automatically positioning a head or cover for reception by each container in turn during vertical movement thereof in said container positioning means, said cover positioning means also forming part of said receiving and centering means, means for delivering heads or covers successively to said cover positioning means, means for automatically rendering said cover delivering means inoperable in the absence of a container in said container delivering means, and means for automatically checking movement of all delivering and positioning means in the absence of a head or cover in said cover delivering means.

30. In a machine of the character described, the combination, with intermittently actuated means for vertically positioning open containers successively in the seaming mechanism of a heading machine, continuously actuated means for successively delivering said containers to said positioning means at accelerated speed and without deflection from a rectilineal path of movement, and coöperative means for receiving and centering the delivered containers, of intermittently actuated means for automatically positioning a head or cover for reception by each container in turn during vertical movement thereof in said container positioning means, said cover positioning means also forming part of said receiving and centering means, intermittently actuated means for delivering heads or covers successively to said cover positioning means, and means for automatically rendering said cover delivering means inoperable in the absence of a container in said container delivering means.

31. In a machine of the character described, the combination, with intermittently actuated means for vertically positioning open containers successively in the seaming mechanism of a heading machine, continuously actuated means for successively delivering said containers to said positioning means at accelerated speed and without deflection from a rectilineal path of movement, and coöperative means for receiving and centering the delivered containers, of intermittently actuated means for automatically positioning a head or cover for reception by each container in turn during vertical movement thereof in said container positioning means, said cover positioning means also forming part of said receiving and centering means, intermittently actuated means for delivering heads or covers successively to said cover positioning means, and means for automatically checking movement of all delivering and positioning means in the absence of a head or cover in said cover delivering means.

32. In a machine of the character described, the combination, with intermittently actuated means for vertically positioning open containers successively in the seaming mechanism of a heading machine, continuously actuated means for successively delivering said containers to said positioning means at accelerated speed and without deflection from a rectilineal path of movement, and coöperative means for receiving and centering the delivered containers, of intermittently actuated means for automatically positioning a head or cover for reception by each container in turn during vertical movement thereof in said container positioning means, said cover positioning means also forming part of said receiving and centering means, intermittently actuated means for delivering heads or covers successively to said cover positioning means, means for rendering said cover delivering means inoperable in the absence of a container in said container delivering means, and means for automatically checking movement of all delivering and positioning means in the absence of a head or cover in said cover delivering means.

33. In a machine of the character described, the combination, with means for vertically positioning open containers successively in the seaming mechanism of a heading machine, and means for successively delivering said containers to said positioning means without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, means for delivering heads or covers successively to said turret, and means for automatically rendering said cover delivering means inoperable in the absence of a container in said container delivering means.

34. In a machine of the character described, the combination, with means for vertically positioning open containers successively in the seaming mechanism of a heading machine, and means for successively delivering said containers to said positioning means without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, means for delivering heads or covers successively to said turret, and means for automatically checking movement of all delivering and positioning means in the absence of a head or cover in said cover delivering means.

35. In a machine of the character described, the combination, with means for vertically positioning open containers successively in the seaming mechanism of a heading machine, and means for successively delivering said containers to said positioning means without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, means for delivering heads or covers successively to said turret, means for automatically rendering said cover delivering means inoperable in the absence of a container in said container delivering means, and means for automatically checking movement of all delivering and positioning means in the absence of a head or cover in said cover delivering means.

36. In a machine of the character described, the combination, with intermittently actuated means for vertically positioning open containers successively in the seaming mechanism of a heading machine, and continuously actuated means for successively delivering said containers to said positioning means without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, means for delivering heads or covers successively to said turret, and means for automatically rendering said cover delivering means inoperable in the absence of a container in said container delivering means.

37. In a machine of the character described, the combination, with intermittently actuated means for vertically positioning open containers successively in the seaming mechanism of a heading machine, and continuously actuated means for successively delivering said containers to said positioning means without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, means for delivering heads or covers successively to said turret, and means for automatically checking movement of all delivering and positioning means in the absence of a head or cover in said cover delivering means.

38. In a machine of the character described, the combination, with intermittently actuated means for vertically positioning open containers successively in the seaming mechanism of a heading machine, and continuously actuated means for successively delivering said containers to said positioning means without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, means for delivering heads or covers successively to said turret, means for automatically rendering said cover delivering means inoperable in the absence of a container in said container delivering means, and means for automatically checking movement of all delivering and positioning means in the absence of a head or cover in said cover delivering means.

39. In a machine of the character described, the combination, with means for vertically positioning open containers successively in the seaming mechanism of a heading machine, and means for successively delivering said containers to said positioning means at accelerated speed and without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, means for delivering heads or covers successively to said turret, and means for automatically rendering said cover delivering means inoperable in the absence of a container in said container delivering means.

40. In a machine of the character described, the combination, with means for vertically positioning open containers successively in the seaming mechanism of a heading machine, and means for successively delivering said containers to said positioning means at accelerated speed and without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, means for delivering heads or covers successively to said turret, and means for automatically checking movement of all delivering and positioning means in the absence of a head or cover in said cover delivering means.

41. In a machine of the character described, the combination, with means for vertically positioning open containers successively in the seaming mechanism of a heading machine, and means for successively delivering said containers to said positioning means at accelerated speed and without deflection from a rectilineal path of movement, of a revoluble turret adapted to receive the delivered containers and center the same successively in said positioning means and also adapted to receive heads or covers and successively position the same for reception by each container in turn during vertical movement thereof in said container positioning means, means for delivering heads or covers successively to said turret, means for automatically rendering said cover delivering means inoperable in the absence of a container in said container delivering means, and means for automatically checking movement of all delivering and positioning means in the absence of a head or cover in said cover delivering means.

42. In a machine of the character described, the combination, with intermittently actuated means for vertically positioning open containers successively in the seaming mechanism of a heading machine, and continuously actuated means for successively delivering said containers to said positioning means at accelerated speed and without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, means for delivering heads or covers successively to said turret, and means for automatically rendering said cover delivering means inoperable in the absence of a container in said container delivering means.

43. In a machine of the character described, the combination, with intermittently actuated means for vertically positioning open containers successively in the seaming mechanism of a heading machine, and continuously actuated means for successively delivering said containers to said positioning means at accelerated speed and without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, means for delivering heads or covers successively to said turret, and means for automatically checking movement of all delivering and positioning means in the absence of a head or cover in said cover delivering means.

44. In a machine of the character described, the combination, with intermittently actuated means for vertically positioning open containers successively in the seaming mechanism of a heading machine, and continuously actuated means for successively delivering said containers to said positioning means at accelerated speed and without deflection from a rectilineal path of movement, of an intermittently revolving turret adapted to receive the delivered containers and center the same successively in said positioning means and also adapted to receive heads or covers and successively position the same for reception by each container in turn during vertical movement thereof in said container positioning means, means for delivering heads or covers successively to said turret, means for automatically rendering said cover delivering means inoperative in the absence of a container in said container delivering means, and means for automatically checking movement of all delivering and positioning means in the absence of a head or cover in said cover delivering means.

45. In a machine of the character described, the combination, with means for successively positioning open containers in the seaming mechanism of a heading machine, means for successively delivering said containers to said positioning means, and means independent of the container delivering means and positively driven for compressing the contents of said containers in transit without interruption of advancing movement, of means for automatically positioning a head or cover for reception by each container during movement thereof in said positioning means.

46. In a machine of the character described, the combination, with means for vertically positioning open containers successively in the seaming mechanism of a heading machine, means for successively delivering said containers to said positioning means, and means independent of the container delivering means and positively driven for compressing the contents of said containers in transit without interruption of advancing movement, of means for automatically positioning a head or cover for reception by each container during vertical movement thereof in said first-mentioned positioning means preliminary to the seaming operation.

47. In a machine of the character described, the combination, with means for successively positioning open containers in the seaming mechanism of a heading machine, means for successively delivering said containers at accelerated speed to said positioning means, and means operable to compress the contents of said cans in transit without interruption of advancing movement, of means for automatically positioning a head or cover for reception by each container during movement thereof in said positioning means.

48. In a machine of the character described, the combination, with means for vertically positioning open containers successively in the seaming mechanism of a heading machine, means for successively delivering said containers at accelerated speed to said positioning means, and means operable to compress the contents of said cans in transit without interruption of advancing movement, of means for automatically positioning a head or cover for reception by each container during movement thereof in said positioning means.

49. In a machine of the character described, the combination, with means for successively positioning open containers in the seaming mechanism of a heading machine, means for successively delivering said containers to said positioning means without deflection from a rectilinear path of movement, and means independent of the container delivering means and positively driven for compressing the contents of said containers in transit without interruption of advancing movement, of means for automatically positioning a head or cover for reception by each container during movement thereof in said first-mentioned positioning means.

50. In a machine of the character described, the combination, with means for vertically positioning open containers successively in the seaming mechanism of a heading machine, means for successively delivering said containers to said positioning means without deflection from a rectilinear path of movement, and means independent of the container delivering means and positively driven for compressing the contents of said containers in transit without interruption of advancing movement, of means for automatically positioning a head or cover for reception by each container during vertical movement thereof in said first-mentioned positioning means preliminary to the seaming operation.

51. In a machine of the character described, the combination, with means for successively positioning open containers in the seaming mechanism of a heading machine, means for successively delivering said containers at accelerated speed to said positioning means without deflection from a rectilinear path of movement, and means operable to compress the contents of said cans in transit without interruption of advacing movement, of means for automatically positioning a head or cover for reception by each container during movement thereof in said first-mentioned positioning means.

52. In a machine of the character described, the combination, with means for vertically positioning open containers successively in the seaming mechanism of a heading machine, means for successively delivering said containers at accelerated speed to said positioning means without deflection from a rectilineal path of movement, and means operable to compress the contents of said cans in transit without interruption of advancing movement, of means for automatically positioning a head or cover for reception by each container during vertical movement thereof in said first-mentioned positioning means.

53. In combination in a can heading machine, a table, means for transporting the can bodies continuously along the table, a plunger to enter the open upper end of the can bodies and means for giving said plunger a vertical movement to enter the can bodies and shape the same and for giving said plunger a lateral movement to follow the onward movement of the can bodies, said plunger operating means consisting of a pair of cranks, a yoke to which said cranks are connected, a stem guided vertically in the yoke and carrying the plunger and means for operating the cranks, substantially as described.

54. In combination in a can heading machine, a table, means for transporting the can bodies along the table, a plunger to enter the open upper end of the can bodies and means for giving said plunger a vertical movement to enter the can bodies and shape the same and for giving said plunger a lateral movement to follow the onward movement of the can bodies, said plunger operating means consisting of a pair of cranks, a yoke to which said cranks are connected, a stem guided vertically in the yoke and carrying the plunger and means for operating the cranks, the said stem being yieldingly supported in the yoke, substantially as described.

55. In combination, with the seaming mechanism of a can heading machine and a vertically reciprocable platform for positioning the assembled can parts in said mechanism, of an intermittently rotating turret having peripheral recesses each adapted to receive a can and support a can head or cover above said can, means for successively delivering cans to be headed to said platform and within said recesses successively without deflection from a rectilineal path of advancement, means for successively positioning can heads or covers in the recesses of said turret successively for superposition on said cans when the latter are successively raised by said platform and thereby positioned in said seaming mechanism, and means for automatically checking operation of said cover positioning means in the absence of a can in process of delivery to said platform and said turret to receive said cover.

56. In combination, with the seaming mechanism of a can heading machine and a vertically reciprocable platform for positioning the assembled can parts in said mechanism, of an intermittently rotating turret having peripheral recesses each adapted to receive a can and support a can head or cover above said can, continuously operating means for successively delivering cans to be headed to said platform and within said recesses successively without deflection from a rectilineal path of advancement, means intermittently effectively operable for successively positioning can heads or covers in the recesses of said turret successively for superposition on said cans when the latter are successively raised by said platform and thereby positioned in said seaming mechanism, and means for automatically checking operation of said cover positioning means in the absence of a can in process of delivery to said platform and said turret to receive said cover.

57. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, means for successively delivering cans to be headed at accelerated speed to said platform and within said recesses successively, means for successively positioning can heads or covers in the recesses of said turret successively for superposition on said cans when the latter are successively raised by said platform and thereby positioned in said seaming mechanism, and means for automatically checking operation of said cover positioning means in the absence of a can in process of delivery to said platform and said turret to receive said cover.

58. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, continuously operating means for successively delivering cans to be headed at accelerated speed to said platform and within said recesses successively, means intermittently effectively operable for successively positioning can heads or covers in the recesses of said turret successively for superposition on said cans when the latter are successively raised by said platform and thereby positioned in said seaming mechanism, and means for automatically checking operation of said cover positioning means in the absence of a can in process of delivery to said platform and said turret to receive said cover.

59. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, means for successively delivering cans to be headed at accelerated speed to said platform and within said recesses successively without deflection from a rectilineal path of advancement, means for successively positioning can heads or covers in the recesses of said turret successively for superposition on said cans when the latter are successively raised by said platform and thereby positioned in said seaming mechanism, and means for automatically checking operation of said cover positioning means in the absence of a can in process of delivery to said platform and said turret to receive said cover.

60. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, continuously operating means for successively delivering cans to be headed at accelerated speed to said platform and within said recesses successively without deflection from a rectilineal path of advancement, means intermittently effectively operable for successively positioning can heads or covers in the recesses of said turret successively for superposition on said cans when the latter are successively raised by said platform and thereby positioned in said seaming mechanism, and means for automatically checking operation of said cover positioning means in the absence of a can in process of delivery to said platform and said turret to receive said cover.

61. In combination, with the seaming mechanism of a can heading machine and a vertically reciprocable platform for positioning the assembled can parts in said mechanism, of an intermittently rotating turret having peripheral recesses each adapted to receive a can and support a can head or cover above said can, means for successively delivering cans to be headed to said platform and within said recesses successively without deflection from a rectilineal path of advancement, means for successively positioning can heads or covers in the recesses of said turret successively for superposition on said cans when the latter are successively raised by said platform and thereby positioned in said seaming mechanism, and means for automatically terminating actuation of said can delivering means in the absence of a head or cover in said cover positioning means.

62. In combination, with the seaming mechanism of a can heading machine and a vertically reciprocable platform for positioning the assembled can parts in said mechanism, of an intermittently rotating turret having peripheral recesses each adapted to receive a can and support a can head or cover above said can, continuously operating means for successively delivering cans to be headed to said platform and within said recesses successively without deflection from a rectilineal path of advancement, means intermittently effectively operable to successively position can heads or covers in the recesses of said turret successively for superposition on said cans when the latter are successively raised by said platform and thereby positioned in said seaming mechanism, and means for automatically terminating actuation of said can delivering means in the absence of a head or cover in said cover positioning means.

63. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, means for successively delivering cans to be headed at accelerated speed to said platform and within said recesses successively, means for successively positioning can heads or covers in the recesses of said turret successively for superposition on said cans when the latter are successively raised by said platform and thereby positioned in said seaming mechanism, and means for automatically terminating actuation of said can delivering means in the absence of a head or cover in said cover positioning means.

64. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, continuously operating means for successively delivering cans to be headed to said platform and within said recesses successively, means intermittently effectively operable to successively position can heads or covers in the recesses of said turret successively for superposition on said cans when the latter are successively raised by said platform and thereby positioned in said seaming mechanism, and means for automatically terminating actuation of said can delivering means in the absence of a head or cover in said cover positioning means.

65. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, means for successively delivering cans to be headed at accelerated speed to said platform and within said recesses successively without deflection from a rectilineal path of advancement, means for successively positioning can heads or covers in the recesses of said turret successively for superposition on said cans when the latter are successively raised by said platform and thereby positioned in said seaming mechanism, and means for automatically terminating actuation of said can delivering means in the absence of a head or cover in said cover positioning means.

66. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, continuously operating means for successively delivering cans to be headed at accelerated speed to said platform and within said recesses successively without deflection from a rectilineal path of advancement, means intermittently effectively operable to successively position can heads or covers in the recesses of said turret successively for superposition on said cans when the latter are successively raised by said platform and thereby positioned in said seaming mechanism, and means for automatically terminating actuation of said can delivering means in the absence of a head or cover in said cover positioning means.

67. In combination, with the seaming mechanism of a can heading machine and a vertically reciprocable platform for positioning the assembled can parts in said mechanism, of an intermittently rotating turret having peripheral recesses each adapted to receive a can and support a can head or cover above said can, means for successively delivering cans to be headed to said platform and within said recesses successively without deflection from a rectilineal path of advancement, means for successively positioning can heads or covers in the recesses of said turret successively for superposition on said cans when the latter are successively raised by said platform and thereby positioned in said seaming mechanism, means for automatically checking operation of said cover positioning means in the absence of a can in process of delivery to said platform and said turret to receive said cover, and means for automatically terminating actuation of said can delivery means in the absence of a head or cover in said cover positioning means.

68. In combination, with the seaming mechanism of a can heading machine and a vertically reciprocable platform for positioning the assembled can parts in said mechanism, of an intermittently rotating turret having peripheral recesses each adapted to receive a can and support a can head or cover above said can, continuously operating means for successively delivering cans to be headed to said platform and within said recesses successively without deflection from a rectilineal path of advancement, means intermittently effectively operable to successively position can heads or covers in the recesses of said turret successively for superposition on said cans when the latter are successively raised by said platform and thereby positioned in said seaming mechanism, means for automatically checking operation of said cover positioning means in the absence of a can in process of delivery to said platform and said turret to receive said cover, and means for automatically terminating actuation of said can delivering means in the absence of a head or cover in said cover positioning means.

69. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, means for successively delivering cans to be headed at accelerated speed to said platform and within said recesses successively, means for successively positioning can heads or covers in the recesses of said turret successively for superposition on said cans when the latter are successively raised by said platform and thereby positioned in said seaming mechanism, means for automatically checking operation of said cover positioning means in the absence of a can in process of delivery to said platform and said turret to receive said cover, and means for automatically terminating actuation of said can delivering means in the absence of a head or cover in said cover positioning means.

70. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, continuously operating means for successively delivering cans to be headed at accelerated speed to said platform and within said recesses successively, means intermittently effectively operable to successively position can heads or covers in the recesses of said turret successively for superposition on said cans when the latter are successively raised by said platform and thereby positioned in said seaming mechanism, means for automatically checking operation of said cover positioning means in the absence of a can in process of delivery to said platform and said turret to receive said cover, and means for automatically terminating actuation of said can delivering means in the absence of a head or cover in said cover positioning means.

71. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, means for successively delivering cans to be headed at accelerated speed to said platform and to said recesses successively without deflection from a rectilineal path of advancement, means for successively positioning can heads or covers in the recesses of said turret successively for superposition on said cans when the latter are successively raised by said platform and thereby positioned in said seaming mechanism, means for automatically checking operation of said cover positioning means in the absence of a can in process of delivery to said platform and said turret to receive said cover, and means for automatically terminating actuation of said can delivering means in the absence of a head or cover in said cover positioning means.

72. In combination, with the seaming mechanism of a can heading machine and a vertically reciprocating platform for positioning the assembled can parts in said mechanism, of an intermittently rotating turret having peripheral recesses each adapted to receive a can and support a can head or cover above said can, continuously operating means for successively delivering cans to be headed at accelerated speed to said platform and within said recesses successively without deflection from a rectilineal path of advancement, means intermittently effectively operable to successively position can heads or covers in the recesses of said turret successively for superposition on said cans when the latter are successively raised by said platform and thereby positioned in said seaming mechanism, means for automatically checking operation of said cover positioning means in the absence of a can in process of delivery to said platform and said turret to receive said cover, and means for automatically terminating actuation of said can delivering means in the absence of a head or cover in said cover positioning means.

73. In combination, with the seaming mechanism of a can heading machine, and means for vertically positioning open containers successively in said mechanism, of means for successively delivering said containers to said positioning means without deflection from a rectilineal path of movement, said last-mentioned means comprising a suitable track and a plurality of endless conveyers operated at different velocities and adapted to advance said containers along said track at accelerated speed, and means for automatically positioning a head or cover for reception by each container during vertical movement thereof in said first-mentioned positioning means.

74. In combination, with the seaming mechanism of a can heading machine, of means for successively delivering open containers to said mechanism without deflection from a rectilineal path of movement, said means comprising a suitable track and a plurality of endless conveyers operated at different velocities and adapted to advance said containers along said track at accelerated speed, normally inoperable means for automatically positioning a head or cover for reception by each container during preliminary movement thereof in said seaming mechanism, and means adapted to be engaged and actuated by a container in transit along said track to render said head or cover positioning means operable for the positioning of a head or cover for the advancing and actuating container.

75. In combination, with the seaming mechanism of a can heading machine, and means for vertically positioning open containers successively in said mechanism, of means for successively delivering said containers to said positioning means without deflection from a rectilineal path of movement, said last-mentioned means comprising a suitable track and a plurality of endless conveyers operated at different velocities and adapted to advance said containers along said track at accelerated speed, normally inoperable means for automatically positioning a head or cover for reception by each container during vertical movement thereof in said first-mentioned positioning means, and means adapted to be engaged and actuated by a container in transit along said track to render said head or cover positioning means operable for the positioning of a head or cover for the advancing and actuating container.

76. In combination, with the seaming mechanism of a can heading machine, of means for successively delivering open containers to said mechanism, said means comprising a suitable track and a plurality of endless conveyers operated at different velocities and adapted to advance said containers along said track at accelerated speed, means successively operable to advance a head or cover to position for reception by each container during final movement thereof preliminary to the seaming operation, said can delivering means and said cover advancing means being actuated from common driving means, and means for disconnecting said driving means in the absence of a head or cover in said cover advancing means.

77. In combination, with the seaming mechanism of a can heading machine, of means for successively delivering open containers to said mechanism, said means comprising a suitable track and a plurality of endless conveyers operated at different velocities and adapted to advance said containers along said track at accelerated speed, normally inoperable means for automatically positioning a head or cover for reception by each container during final movement thereof preliminary to the seaming operation, said can delivering means and said cover positioning means being actuated from common driving means, means for disconnecting said driving means in the absence of a head or cover in said cover positioning means, and means adapted to be engaged and actuated by a container in transit along said track to render said head or cover positioning means operable for the positioning of a head or cover for the advancing and actuating container.

78. In combination, with the seaming mechanism of a can heading machine, of means for successively delivering open containers to said mechanism, said means comprising a suitable track and a plurality of endless conveyers operated at different velocities and adapted to advnce said containers along said track at accelerater speed, means successively operable to advance a head or cover to position for reception by each container during final movement thereof preliminary to the seaming operation, said can delivering means and said cover advancing means being actuated from common driving means, means operable during operation of said cover advancing means for disconnecting said driving means, and means located in the path of movement of and actuated by an advancing cover to render said disconnecting means inoperable.

79. In combination, with the seaming mechanism of a can heading machine, of means for successively delivering open containers to said mechanism, said means comprising a suitable track and a plurality of endless conveyers operated at different velocities and adapted to advance said containers along said track at accelerated speed, normally inoperable means for automatically advancing a head or cover to position for reception by each container during final movement thereof preliminary to the seaming operation, said can delivering means and said cover advancing means having common driving means, means operable during operation of said cover advancing means for disconnecting said driving means, means located in the path of movement of and actuated by an advancing cover to render said disconnecting means inoperable, and means adapted to be engaged and actuated by a container in transit along said track to render said head or cover advancing means operable for the positioning of a head or cover for the advancing and actuating container.

80. In combination, with the seaming mechanism of a can heading machine, and mechanisms for automatically delivering cans and can covers to and assembling the same in said seaming mechanism, said can-delivering mechanism advancing the cans without deflection from a rectilineal path of movement, all of said mechanisms being actuated from common driving means, of a clutch interposed between said driving means and said delivering and assembling mechanisms, means normally operable intermediate the seaming operations to release said clutch, and means automatically actuated by each can cover in turn in process of delivery to prevent operation of said releasing means.

81. In combination, with the seaming mechanism of a can heading machine, and mechanisms for automatically delivering cans and can covers to and assembling the same in said seaming mechanism, said can-delivering mechanism advancing the cans without deflection from a rectilineal path of movement, all of said mechanisms being actuated from common driving means, of a clutch interposed between said driving means and said delivering and assembling mechanisms, means normally operable intermediate the seaming operations to release said clutch, means automatically actuated by each can cover in turn in process of delivery to check operation of said releasing means, and manually actuated means for controlling operation of said checking means.

82. In combination, with the seaming mechanism of a can heading machine, and mechanisms for automatically delivering cans and can covers to and assembling the same in said seaming mechanism, said can-delivering mechanism advancing the cans without deflection from a rectilineal path of movement, all of said mechanisms being actuated from common driving means, of a clutch interposed between said driving means and said delivering and assembling mechanisms, means normally operable intermediate the seaming operations to release said clutch, means automatically actuated by each advancing can cover in turn to prevent operation of said releasing means, and means for preventing effective operation of the cover delivering mechanism in the absence of a can in the can delivering mechanism being positioned to receive a cover.

83. In combination, with the seaming mechanism of a can heading machine, and mechanisms for automatically delivering cans and can covers to and assembling the same in said seaming mechanism, said can-delivering mechanism advancing the cans without deflection from a rectilineal path of movement, all of said mechanisms being actuated from common driving means, of a clutch interposed between said driving means and said delivering and assembling mechanisms, means normally operable intermediate the seaming operations to release said clutch, means automatically actuated by each advancing can cover in turn to check operation of said releasing means, manually actuated means for controlling operation of said checking means, and means for preventing effective operation of the cover delivering mechanism in the absence of a can in the can delivering mechanism being positioned to receive a cover.

84. In combination, with the seaming mechanism of a can heading machine, and mechanisms for automatically delivering cans and can covers to and assembling the same in said seaming mechanism, said can-delivering mechanism advancing the cans without deflection from a rectilineal path of movement, all of said mechanisms being actuated from common driving means, of a clutch interposed between said driving means and said delivering and assembling mechanisms, means normally operable intermediate the seaming operations to release said clutch, means automatically actuated by each advancing can cover in turn to prevent operation of said releasing means, means normally rendering the cover delivering mechanism inoperable, and means adapted to be engaged and actuated by a can in transit in the can delivering means to render the cover delivering mechanism operable for the positioning of a cover for the advancing and actuating can.

85. In combination, with the seaming mechanism of a can heading machine, and mechanisms for automatically delivering cans and can covers to and assembling the same in said seaming mechanisms, said can-delivering mechanism advancing the cans without deflection from a rectilineal path of movement, all of said mechanisms being actuated from common driving means, of a clutch interposed between said driving means and said delivering and assembling mechanisms, means normally operable intermediate the seaming operations to release said clutch, means automatically actuated by each advancing can cover in turn to check operation of said releasing means, manually actuated means for controlling operation of said checking means, means normally rendering the cover delivering mechanism inoperable, and means adapted to be engaged and actuated by a can in transit in the can delivering mechanism to render the cover delivering mechanism operable for the positioning of a cover for the advancing and actuating can.

86. In combination, with the seaming mechanism of a can heading machine, of means for delivering cans and can covers to and assembling the same in said seaming mechanism, the can delivering means comprising a suitable track, a plurality of endless conveyers operated at different velocities to advance the cans in procession along said track at accelerated speed, a rotating table, guides co-operating therewith so disposed as to cause delivery of the cans successively from said table to said track, means for checking said deliveries, and means for alternately releasing and restoring said checking means at regular intervals to permit the delivery of one can only during each period of release.

87. In combination, with the seaming mechanism of a can heading machine, of means for delivering cans and can covers to and assembling the same in said seaming mechanism, the can delivering means comprising a suitable track, a plurality of endless conveyers operated at different speeds to advance the cans in procession along said track at accelerated speed, a rotating table, guides coöperating therewith so disposed as to cause delivery of the cans successively from said table to said track, means for checking said deliveries without interruption of movement of either the table or the conveyers, and means for alternately releasing and restoring said checking means at regular intervals to permit the delivery of one can only during each period of release.

88. In combination, with the seaming mechanism of a can heading machine, of means for delivering cans and can covers to and assembling the same in said seaming mechanism, the can delivering means comprising a suitable track, a plurality of endless conveyers operated at different speeds to advance the cans in procession along said track at accelerated speed, a table rotating at less velocity than that of the initial conveyer, guides coöperating with said table so disposed as to cause delivery of the cans successively from said table to said track, means for checking said deliveries, and means for alternately releasing and restoring said checking means at regular intervals to permit the delivery of one can only during each period of release.

89. In combination, with the seaming mechanism of a can heading machine, of means for delivering cans and can covers to and assembling the same in said seaming mechanism, the can delivering means comprising a suitable track, a plurality of endless conveyers operated at different velocities to advance the cans in procession along said track at accelerated speed, a table rotating at less velocity than that of the initial conveyer, guides coöperating with said table so disposed as to cause delivery of the cans successively from said table to said track, means for checking said deliveries without interruption of movement of either the table or the conveyers, and means for alternately releasing and restoring said checking means at regular intervals to permit the delivery of one can only during each period of release.

90. In combination, with the seaming mechanism of a can heading machine, of means for delivering cans and can covers to and assembling the same in said seaming mechanism, the can delivering means comprising a suitable track, a plurality of endless conveyers operated at different velocities to advance the cans in procession along said track at accelerated speed, a rotating table, guides coöperating therewith so disposed as to cause delivery of the cans successively from said table to said track, initially effective means for checking delivery of the foremost and thereby advancement of all of the cans on said table, contemporaneously ineffective means for checking advancement of the next succeeding can, and means for periodically reversing these conditions of effectiveness and ineffectiveness of said checking means whereby a single can only is delivered to the track at regular and predetermined intervals.

91. In combination, with the seaming mechanism of a can heading machine, of means for delivering cans and can covers to and assembling the same in said seaming mechanism, the can delivering means comprising a suitable track, a plurality of endless conveyers operated at different velocities to advance the cans in procession along said track at accelerated speed, a constantly rotating table, guides coöperating therewith so disposed as to cause delivery of the cans successively from said table to said track, initially effective means for checking delivery of the foremost and thereby advancement of all of the cans on said table, contemporaneously ineffective means for checking advancement of the next succeeding can, and means for periodically reversing these conditions of effectiveness and ineffectiveness of said checking means whereby a single can only is delivered to the track at regular and predetermined intervals.

92. In combination, with the seaming mechanism of a can heading machine, of means for delivering cans and can covers to and assembling the same in said seaming mechanism, the can delivering means comprising a suitable track, a plurality of endless conveyers operated at different velocities to advance the cans in procession along said track at accelerated speed, a table rotating at less velocity than that of the initial conveyer, guides coöperating with said table so disposed as to cause delivery of the cans successively from said table to said track, initially effective means for checking delivery of the foremost and thereby advancement of all of the cans on said table, contemporaneously ineffective means for checking advancement of the next succeeding can, and means for periodically reversing these conditions of effectiveness and ineffectiveness of said checking means whereby a single can only is delivered to the track at regular and predetermined intervals.

93. In combination, with the seaming mechanism of a can heading machine, of means for delivering cans and can covers to and assembling the same in said seaming mechanism, the can delivering means comprising a suitable track, a plurality of endless conveyers operated at different velocities to advance the cans in procession along said track at accelerated speed, a table constantly rotating at less velocity than that of the initial conveyer, guides coöperating with said table so disposed as to cause delivery of the cans successively from said table to said track, initially effective means for checking delivery of the foremost and thereby advancement of all of the cans on said table, contemporaneously ineffective means for checking advancement of the next succeeding can, and means for periodically reversing these conditions of effectiveness and ineffectiveness of said checking means whereby a single can only is delivered to the track at regular and predetermined intervals.

94. In combination, with the seaming mechanism of a can heading machine, means for delivering cans and can heads or covers to and assembling the same in said seaming mechanism, said means including an intermittently rotated shaft carrying a turret having peripheral recesses each adapted to receive a can and support a can head or cover above said can, said seaming mechanism and said delivering and assembling means being actuated from common driving means, of a clutch interposed between said driving means and said delivering and assembling means, means on said turret shaft operable upon rotation of said shaft to release said clutch, and means automatically actuated by each can head or cover in turn in process of delivery to prevent operation of said releasing means.

95. In combination, with the seaming mechanism of a can heading machine, means for delivering cans and can heads or covers to and assembling the same in said seaming mechanism, said means including an intermittently rotated shaft carrying a turret having peripheral recesses each adapted to receive a can and support a can head or cover above said can, said seaming mechanism and said delivering and assembling mechanisms being actuated from common driving means, of a clutch interposed between said driving means and said delivering and assembling means, means on said turret shaft operable upon rotation of said shaft to release said clutch, means automatically actuated by each can head or cover in turn in process of delivery to check operation of said releasing means, and manually actuated means for controlling operation of said checking means.

96. In combination, with the seaming mechanism of a can heading machine, and mechanisms for automatically delivering cans and can covers to and assembling the same in said seaming mechanism, said cover delivering means comprising a reciprocating pusher adapted on its forward stroke to engage a cover and advance the same for ultimate conveyance to assembling position, and all of said mechanisms being actuated from common driving means, of a clutch interposed between said driving means and said delivering and assembling mechanisms, means normally operable intermediate the seaming operations to release said clutch, a member located in the path of movement of the can covers and adapted to be displaced by a cover being advanced by said pusher, and means actuated by such displacement of said member to prevent operation of said releasing means.

97. In combination, with the seaming mechanism of a can heading machine, and mechanisms for automatically delivering cans and can covers to and assembling the same in said seaming mechanism, said cover delivering mechanism comprising a reciprocating pusher adapted on its forward stroke to engage a cover and advance the same for ultimate conveyance to assembling position, and all of said mechanisms being actuated from common driving means, of a clutch interposed between said driving means and said delivering and assembling mechanisms, means normally operable intermediate the seaming operations to release said clutch, a member located in the path of movement of the can covers and adapted to be displaced by a cover being advanced by said pusher, means actuated by such displacement of said member to prevent operation of said releasing means, and means for automatically returning the displaced member upon return stroke of said pusher after delivery of a cover.

98. In combination, with the seaming mechanism of a can heading machine, and mechanisms for automatically delivering cans and can covers to and assembling the same in said seaming mechanism, said cover delivering mechanism comprising a reciprocating pusher adapted on its forward stroke to engage a cover and advance the same for ultimate conveyance to assembling position, and all of said mechanisms being actuated from common driving means, of a clutch interposed between said driving means and said delivering and assembling mechanisms, means normally operable intermediate the seaming operations to release said clutch, a member located in the path of movement of the can covers and adapted to be displaced by a cover being advanced by said pusher, means actuated by such displacement of said member to prevent operation of said releasing means, and means adapted to be carried into the path of movement of said pusher by displacement of said member and be displaced by said pusher upon its return stroke to return said member to initial position.

In testimony of the foregoing, I have hereunto set my hand in the presence of two witnesses.

JULIUS BRENZINGER.

Witnesses:
JAMES A. SWEET,
ROSE M. WHITE.